(12) United States Patent
Vanderwende et al.

(10) Patent No.: US 10,769,958 B2
(45) Date of Patent: *Sep. 8, 2020

(54) GENERATING HIGH-LEVEL QUESTIONS FROM SENTENCES

(71) Applicant: Microsoft Technology Licensing, LLC, Redmond, WA (US)

(72) Inventors: Lucretia H. Vanderwende, Sammamish, WA (US); Sumit Basu, Seattle, WA (US); Charles E. Jacobs, Seattle, WA (US); Junyi Li, Philadelphia, PA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,798

(22) Filed: Jul. 29, 2019

(65) Prior Publication Data

US 2019/0355267 A1 Nov. 21, 2019

Related U.S. Application Data

(63) Continuation of application No. 14/469,529, filed on Aug. 26, 2014, now Pat. No. 10,366,621.

(51) Int. Cl.
*G09B 7/00* (2006.01)
*G06F 16/332* (2019.01)

(52) U.S. Cl.
CPC ........... *G09B 7/00* (2013.01); *G06F 16/3329* (2019.01)

(58) Field of Classification Search
CPC .............................. G09B 7/00; G06F 16/3329
See application file for complete search history.

(56) References Cited

FOREIGN PATENT DOCUMENTS

| CN | 102135955 A | 7/2011 |
|---|---|---|
| CN | 102163215 A | 8/2011 |
| CN | 103226562 A | 7/2013 |

OTHER PUBLICATIONS

"First Office Action and Search Report Issued in Chinese Patent Application No. 201580045741.4", dated Sep. 20, 2019, 13 Pages.

*Primary Examiner* — Eddy Saint-Vil
(74) *Attorney, Agent, or Firm* — Alleman Hall Creasman & Tuttle LLP

(57) ABSTRACT

Questions about a passage of text that includes a sequence of two or more sentences are generated. Each question covers the content of a plurality of sentences in the passage, and includes a context portion of the passage and a question statement that is contextually related to the context portion of the passage. A user is also provided with questions about a passage of text they are reading. Each question is presented to the user, where this presentation includes displaying the context portion of the passage and the question statement that is contextually related to the context portion of the passage.

20 Claims, 14 Drawing Sheets

GENERATING HIGH-LEVEL QUESTIONS FROM SENTENCES

CROSS REFERENCE TO RELATED APPLICATIONS

This application is a continuation of U.S. patent application Ser. No. 14/469,529, filed Aug. 26, 2014, the entire contents of which is hereby incorporated herein by reference for all purposes.

BACKGROUND

The Internet is a global data communications system that serves billions of users worldwide. The Internet provides users access to a vast array of online information resources and services, including those provided by the World Wide Web, intranet-based enterprises, and the like. The World Wide Web currently hosts billions of webpages which collectively host a massive and ever-growing amount of textual content covering any subject a user might be interested in. Thanks to the ubiquity of the Internet, the various types of network-enabled personal computing devices (such as personal computers, laptop/notebook computers, smart phones, tablet computers, and dedicated e-reader devices) that are readily and cost-effectively available, and the various types of applications that can be run on these devices, users across the globe can easily search for, retrieve and read any type of textual content covering any subject they are interested in.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Question generation technique implementations described herein generally involve generating questions about a passage of text that includes a sequence of two or more sentences. In one exemplary implementation the passage is received. A question about the passage is then generated, where the question covers the content of a plurality of sentences in the passage, and includes a context portion of the passage and a question statement that is contextually related to the context portion of the passage. The generated question is then output. Examples of such question generation are provided below.

DESCRIPTION OF THE DRAWINGS

The specific features, aspects, and advantages of the question generation technique implementations described herein will become better understood with regard to the following description, appended claims, and accompanying drawings where:

DETAILED DESCRIPTION

Figure 1:
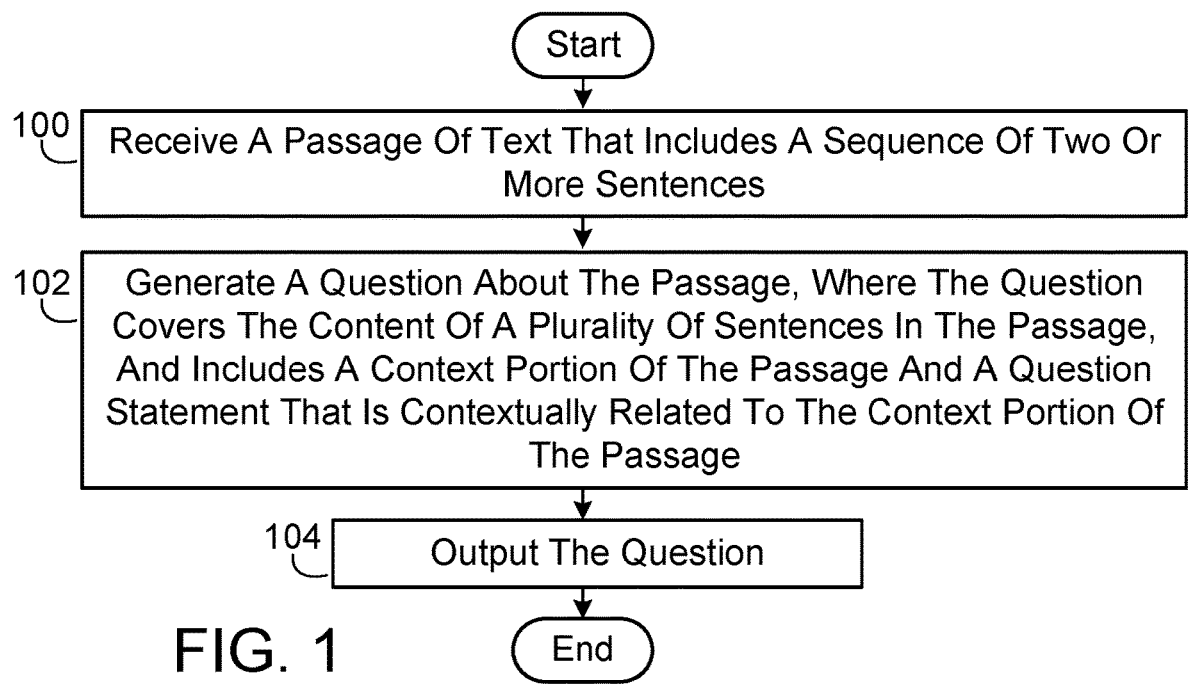
FIG. 1 is a flow diagram illustrating one implementation, in simplified form, of a process for generating questions about a passage of text.

In the following description of question generation technique implementations reference is made to the accompanying drawings which form a part hereof, and in which are shown, by way of illustration, specific implementations in which the question generation technique can be practiced. It is understood that other implementations can be utilized and structural changes can be made without departing from the scope of the question generation technique implementations.

It is also noted that for the sake of clarity specific terminology will be resorted to in describing the question generation technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation can be included in at least one implementation of the question generation technique. The appearances of the phrases "in one implementation", "in another implementation", "in an exemplary implementation", and "in an alternate implementation" in various places in the specification are not necessarily all referring to the same implementation, nor are separate or alternative implementations mutually exclusive of other implementations. Yet furthermore, the order of process flow representing one or more implementations of the question generation technique does not inherently indicate any particular order not imply any limitations of the question generation technique.

1.0 Textual Content on the Web

As described heretofore, there is a massive and every growing amount of textual content currently available on the World Wide Web (herein sometimes simply referred to as the web). Users across the globe can use various types of network-enabled personal computing devices (such as those described heretofore, among others) to search for, retrieve and read any type of textual content covering any subject they are interested in. After a given user reads a given passage of text (e.g., a text span), they may want to determine how much they have understood and retained from the passage (e.g., the user may want to assess their reading comprehension). As is appreciated in the art of psychology, a psychological phenomenon, known as the Dunning-Kruger effect, exists whereby a user who reads a given passage of text will generally over-estimate their knowledge/understanding of the passage. As will be appreciated from the more detailed description that follows, the question generation technique implementations described herein are advantageous in that they can be used in a wide variety of applications to automatically generate questions that can measure the user's understanding of a passage of text. For example, in the case where a user is reading a given electronic book on a dedicated e-reader device, the question generation technique implementations can be used to automatically generate high-level questions about the electronic book that are contextually related to different parts of the electronic book. In the case where a user is reading a passage of text on a webpage, the question generation technique implementations can be used to automatically generate high-level questions about the passage that are contextually related to different parts of the passage. Additional advantages of the question generation technique implementations are described hereafter.

As is appreciated in the art of the Internet, a lot of the textual content that is available on the web is educational in nature. A portion of the educational textual content that is available on the web is part of an existing curriculum and is pre-structured to enable a user who reads the content (e.g., a student) to determine (e.g., gauge) their understanding of the content. One example of such educational textual content is textbooks, which generally include a set of fixed, pre-authored questions at the end of each chapter that the user can answer in order to determine their understanding of the content. In a situation where the user wants to re-determine their understanding of the content at a later date, the question generation technique implementations described herein can be used to automatically generate additional questions that can facilitate this re-determination. In another situation where the user wants a deeper (e.g., a more focused) assessment of their understanding of one or more specific topics within the content, the question generation technique implementations can be used to automatically generate more questions about these specific topics. In yet another situation where a teacher is using a textbook to teach a class, the question generation technique implementations can be used to automatically generate test questions to be included in exams that are given to the students. While some test questions may be available in the teacher's edition of the textbook, the question generation technique implementations allow the teacher to automatically generate different exams from year to year, and to automatically generate more focused test questions that drill deeper into certain topics.

Another portion of the educational textual content that is available on the web is not part of an existing curriculum. For example, consider a situation where a first-time home buyer is reading textual content describing the various types of loans that are available. After the home buyer finishes their reading they may want to know how much they have understood and retained before going to meet with their bank officer. Also consider another situation where a patient is diagnosed with a specific cancer and is sent home from their doctor's office with a set of URLs (uniform resource locators, also known as "links") to specific items of textual content that the patient has to read to learn more about their diagnosis and treatment options. After the patient finishes their reading they may want to know how much they have understood and retained before meeting again with their doctor. The question generation technique implementations described herein can be used to automatically generate questions that allow both the home buyer and the patient to measure their understanding and retention of the textual content they read. The question generation technique implementations also allow both the home buyer and the patient to validate that they have more than just a cursory knowledge/understanding of the content, and to refresh their knowledge of the content over time.

2.0 Generating High-Level Questions from Sentences

Given a passage of text that includes a sequence of two or more sentences (herein sometimes simply referred to as a passage), the term "sentence-level question" is used herein to refer to a question that covers the content of just one of the sentences in the passage so that the answer to the question is contained within just this one sentence (e.g., the answer to the question cannot be contained within any of the other sentences in the passage). In contrast, the term "high-level question" is used herein to refer to a question that covers the content of a plurality of the sentences in the passage so that the answer to the question may be contained within any of the sentences in the passage, or a combination of two or more sentences in the passage. Accordingly, a high-level question about the passage can be thought of as a passage-level question since the high-level question and its answer span a plurality of sentences in the passage.

Given a passage of text that includes a sequence of two or more sentences, the question generation technique implementations described herein generally involve automatically generating high-level questions about the passage along with an answer to each of the high-level questions. As will be appreciated from the more detailed description that follows, rather than processing each sentence of the passage individually (e.g., rather than processing just one sentence of the passage at a time without taking into account the other sentences in the passage) and generating one or more sentence-level questions each of which covers the content of just this one sentence, the question generation technique implementations process the entire sequence of sentences that make up the passage as a group and can generate a set of high-level questions each of which covers the content of a plurality of the sentences in the passage. The question generation technique implementations are thus advantageous in that they can be used to determine a reader's comprehension of higher level content in the passage. The question generation technique implementations also allow high-level questions to be automatically generated that can explore contextually deeper aspects of the passage such as "why?" or "what happened next?", as opposed to making simple grammatical modifications to individual sentences in the passage such as "where", or "when", or "who". The question generation technique implementations also ensure that each of the high-level questions that is automatically generated is grammatically correct. The question generation technique implementations also ensure that the answer to each of the high-level questions is contained within the passage of text from which it was generated.

As is appreciated in the arts of natural language understanding and question generation, sentence-level questions can be generated about a single sentence by simply grammatically modifying the sentence. In other words, a word or word phrase in the single sentence can be identified as the expected answer, this identified word or word phrase can then be replaced with an appropriate question word, and then a set of rules can be applied to generate a grammatically correct sentence-level question. For example, consider an original sentence "John married Jane in Seattle in 2012.". One sentence-level question about the original sentence can be generated by replacing "in Seattle" with "where", resulting in the question "Where did John marry Jane in 2012?" Another sentence-level question about the original sentence can be generated by replacing "in 2012" with "when", resulting in the question "When did John marry Jane in Seattle?". Yet another sentence-level question about the original sentence can be generated by replacing "John" with "who", resulting in the question "Who married Jane in Seattle in 2012?". It is noted that the answer to each of these three sentence-level questions is contained within the original sentence itself. However, if the original sentence were grammatically transformed into the question "Why did John marry Jane?" or the question "What happened after John married Jane?", the answers to these two questions are obviously not contained within the original sentence itself.

2.1 High-Level Question Generation Examples

This section presents a sample passage of text that is used to further describe the question generation technique implementations described herein. This section also presents an exemplary set of high-level questions that can be automatically generated for the sample passage of text using the question generation technique implementations described herein. The sample passage of text is shown below and includes a sequence of three sentences, namely sentence S1, sentence S2 which immediately follows sentence S1, and sentence S3 which immediately follows sentence S2:

S1: Franklin saw the printing press as a device to instruct colonial Americans in moral virtue.

S2: He tried to influence American moral life through construction of a printing network based on a chain of partnerships from the Carolinas to New England.

S3: Franklin thereby invented the first newspaper chain. The above passage of text is hereafter simply referred to as the passage S1-S3.

After receiving and processing the passage S1-S3 (which is described in more detail hereafter), an exemplary implementation of the generation technique described herein can generate two different high-level question statement and answer pairs for the passage S1-S3, namely high-level question statement and answer pair Q1/A1 and high-level question statement and answer pair Q2/A2, which are shown below:

Q1: What resulted from Franklin's views on the role of the printing press?

A1: Because Franklin wanted to use printing press as a device to instruct colonial Americans in moral virtue, he constructed a chain of newspapers from the Carolinas to New England.

Q2: What precipitated Franklin's invention of the first newspaper chain?

A2: Franklin invented the first newspaper chain because he tried to influence American moral life through the printing press and so constructed a printing network from the Carolinas to New England.

It is noted that the high-level question statement Q1 is generated primarily from sentence S1, but the answer A1 to Q1 is contained within both sentence S2 and sentence S3. Similarly, the high-level question statement Q2 is generated primarily from sentence S3, but the answer A2 to Q2 is contained within both sentence S1 and sentence S2 which precede sentence S3 in the passage S1-S3.

It is also noted that the form of the high-level question statement Q1 combines the content of the single sentence S1 with the expected relation between Q1 and its answer A1 (which is a "result" in the case of Q1). Similarly, the form of the high-level question statement Q2 combines the content of the single sentence S3 with the expected relation between Q2 and its answer A2 (which is a "precede" in the case of Q2). However, as will be appreciated from the more detailed description that follows, the question generation technique implementations described herein can also generate a high-level question about the passage S1-S3 that targets the relation between the question and its answer, but uses the content of the sentences in the passage S1-S3 to contextualize the question. In other words, the question generation technique implementations can generate a high-level question about the passage S1-S3 by first identifying a portion of the passage S1-S3 to use as context for the question (hereafter simply referred to as a context portion of the passage), and then transforming the context portion of the passage into a question by augmenting the context portion of the passage with a question statement that includes a small amount of text that is specific to the expected relation between the question and its answer (e.g., "why?", or "how did this happen?"). The context portion of the passage is thus used to contextualize the question about the passage S1-S3.

One example of a high-level question about the passage S1-S3 that targets the relation between the question and its answer, but uses the content of the sentences in the passage S1-S3 to contextualize the question, is the following:

S1: Franklin saw the printing press as a device to instruct colonial Americans in moral virtue.

Q3: What resulted?

It is noted that in the above example sentence S1 is the context portion of the passage S1-S3 which is used to contextualize the high-level question statement Q3, resulting in Q3 being a complex question statement that is made up of relatively simple text.

Another example of a high-level question about the passage S1-S3 that targets the relation between the question and its answer, but uses the content of the sentences in the passage S1-S3 to contextualize the question, is the following:

S3: Franklin thereby invented the first newspaper chain.

Q4: What precipitated this?

It is noted that in the above example sentence S3 is the context portion of the passage S1-S3 which is used to contextualize the high-level question statement Q4, resulting in Q4 also being a complex question that is made up of relatively simple text.

2.2 Process Framework

FIG. 1 illustrates one implementation, in simplified form, of a process for generating questions about a passage of text that includes a sequence of two or more sentences. As exemplified in FIG. 1, the process starts with receiving the passage (action 100). A question about the passage is then generated, where the question covers the content of a plurality of the sentences in the passage, and the question includes a context portion of the passage and a question statement that is contextually related to the context portion of the passage (action 102). In other words, the context portion of the passage is used as context for the question about the passage. The question is then output (action 104). In an exemplary implementation of the question generation technique described herein the passage also includes one or more topics, a plurality of clauses, and one or more noun phrases. The passage is also made up of a sequence of word n-grams. The term "word n-gram" is used herein to refer to a sequence of n words in a given passage of text.

Figure 2:
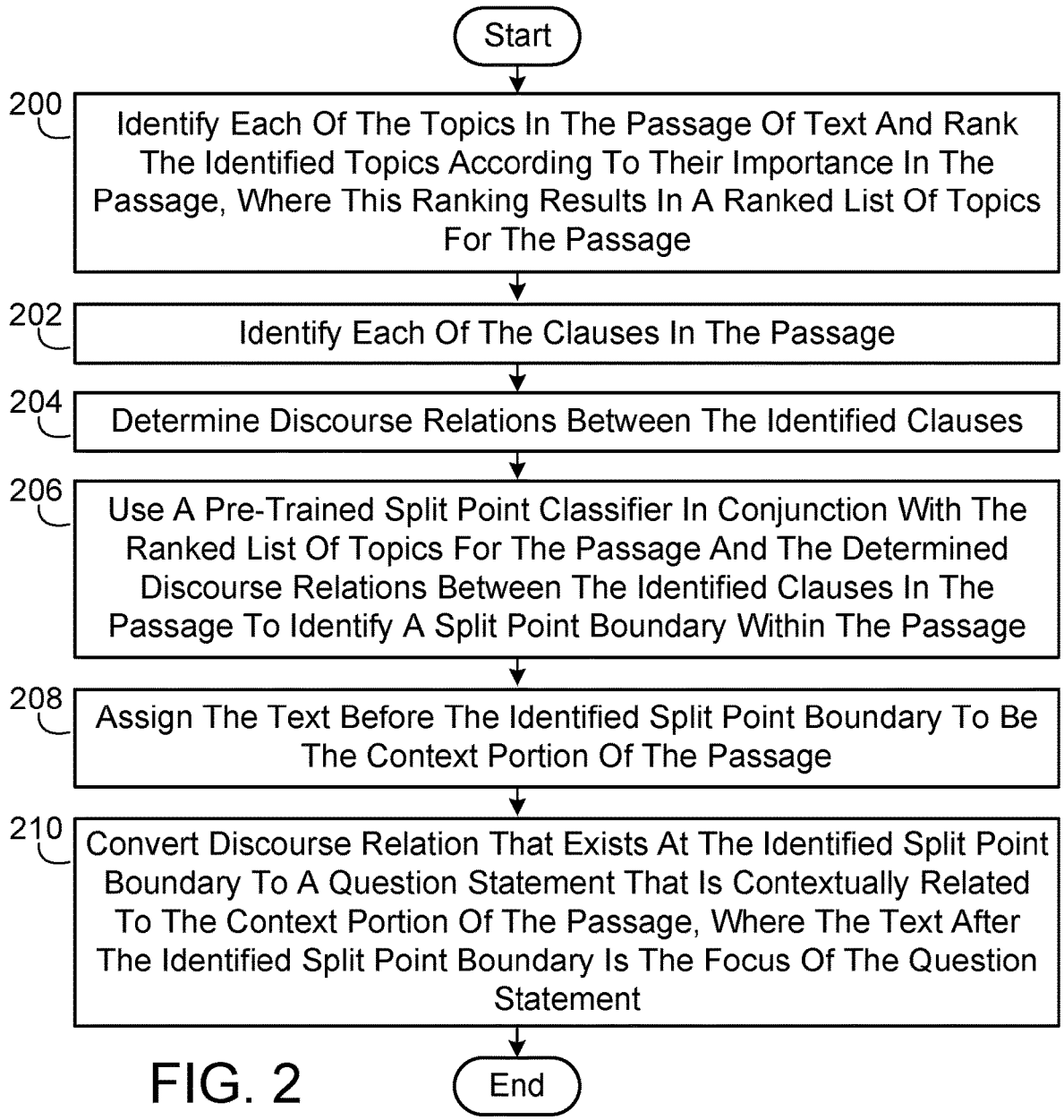
FIG. 2 is a flow diagram illustrating one implementation, in simplified form, of a process for generating a question about the passage of text, where the question covers the content of a plurality of sentences in the passage, and includes a context portion of the passage and a question statement that is contextually related to this context portion.

FIG. 2 illustrates one implementation, in simplified form, of a process for generating a question about the passage of text. As exemplified in FIG. 2, the process starts with identifying each of the topics in the passage and ranking the identified topics according to their importance in the passage, where this ranking results in a ranked list of topics for the passage (action 200); this topic identification and ranking action is described in more detail hereafter. Each of the clauses in the passage is then identified (action 202). Generally speaking and as is appreciated in the art of natural language processing, a clause is a unit of complete thought and can stand on its own as a grammatical sentence. In other words, a clause includes a verb and a subject, and can optionally include other arguments and modifiers such as an object, a complement, and/or an adverbial. In an exemplary implementation of the question generation technique described herein each of the clauses in the passage is identified by syntactically analyzing the passage, where each of the identified clauses can optionally be marked as either a main clause or a subordinate clause that depends on a particular main clause and may be less central to the content of the passage. It is noted that alternate implementations of the question generation technique are also possible where each of the clauses in the passage can be identified using various other methods.

Referring again to FIG. 2, after each of the clauses in the passage of text has been identified (action 202), discourse relations between the identified clauses are determined (action 204); this discourse relations determination action is described in more detail hereafter. Generally speaking and as is appreciated in the art of natural language processing, a discourse relation (also known as a rhetorical relation) is a description of how two different segments of text (e.g., two different clauses) are logically connected to one another. After discourse relations between the identified clauses are determined (action 204), a pre-trained split point classifier is then used in conjunction with the ranked list of topics for the passage and the determined discourse relations between the identified clauses in the passage to identify a split point boundary within the passage (action 206); this split point boundary identification action is also described in more detail hereafter. The text before the identified split point boundary is then assigned to be the aforementioned context portion of the passage (action 208). A discourse relation that exists at the identified split point boundary is then converted to the question statement (action 210), where the text after the identified split point boundary is the focus of the question statement; this split point boundary discourse relation conversion action is also described in more detail hereafter. An exemplary method for training the split point classifier is also described in more detail hereafter.

The aforementioned action of identifying each of the topics in the passage of text and ranking the identified topics according to their importance in the passage (action 200 in FIG. 2) can be implemented in various ways. Exemplary methods for identifying each of the topics in the passage of text and ranking the identified topics are described in more detail hereafter. It is noted that in addition to these exemplary methods, various other methods for identifying each of the topics in the passage and ranking the identified topics are also possible.

The aforementioned action of using a pre-trained split point classifier in conjunction with the ranked list of topics for the passage of text and the determined discourse relations between the identified clauses in the passage to identify a split point boundary within the passage (action 206 in FIG. 2) can also be implemented in various ways. Exemplary methods for performing this split point boundary identification are described in more detail hereafter. It is noted that in addition to these exemplary methods, various other methods for performing this split point boundary identification are also possible.

Figure 12:
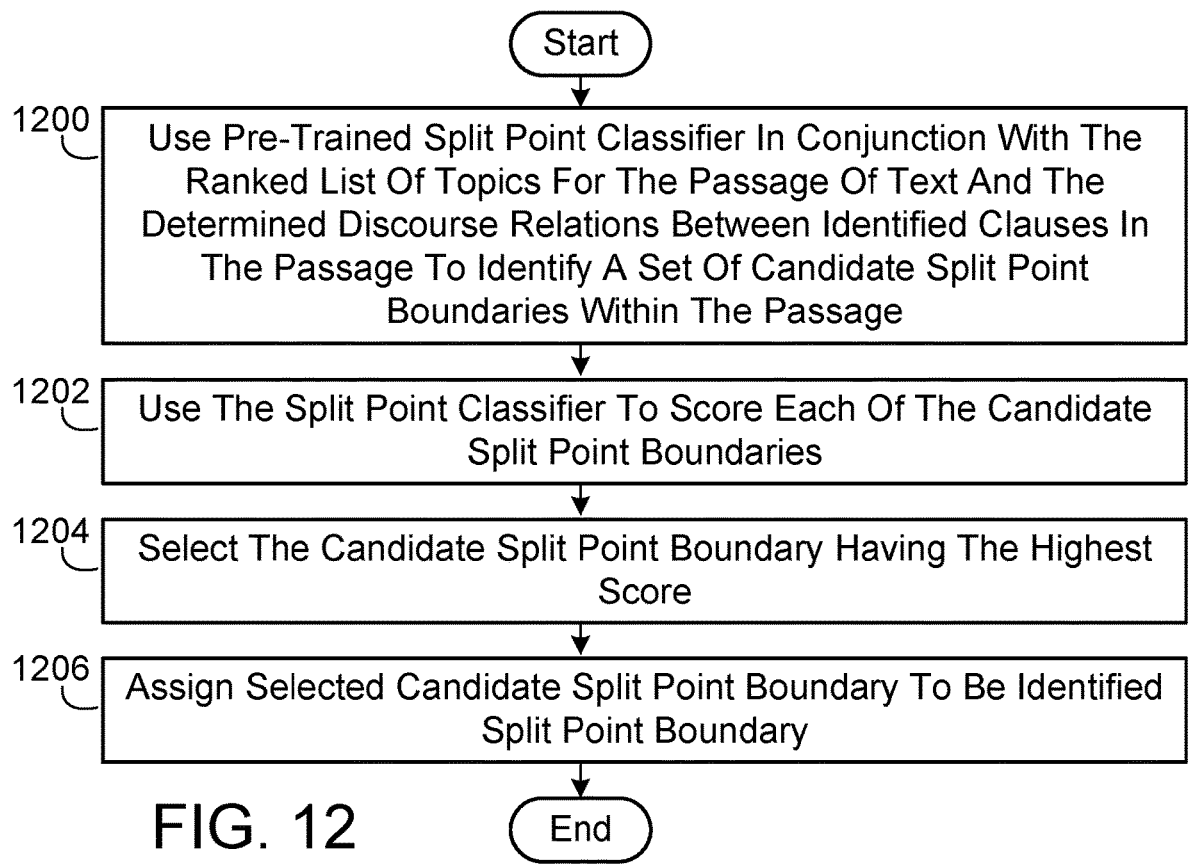
FIG. 12 is a flow diagram illustrating one implementation, in simplified form, of a process for using a pre-trained split point classifier in conjunction with a ranked list of topics for the passage of text and the determined discourse relations between the identified clauses in the passage to identify a split point boundary within the passage.

FIG. 12 illustrates one implementation, in simplified form, of a process for using a pre-trained split point classifier in conjunction with the ranked list of topics for the passage of text and the determined discourse relations between the identified clauses in the passage to identify a split point boundary within the passage. As exemplified in FIG. 12, the process starts with using the split point classifier in conjunction with the ranked list of topics for the passage and the determined discourse relations between the identified clauses in the passage to identify a set of candidate split point boundaries within the passage (action 1200). The split point classifier is then used to score each of the candidate split point boundaries (action 1202). The candidate split point boundary having the highest score is then selected (action 1204). The selected candidate split point boundary is then assigned to be the identified split point boundary (action 1206).

The following alternate implementation (not shown) of the process exemplified in FIG. 12 is also possible. Rather than selecting the candidate split point boundary having the highest score (action 1204), and then using this selected split point boundary to generate a question about the passage of text as described herein, any of the candidate split point boundaries having a score that is higher than a prescribed score threshold can be selected. Then, each of these selected candidate split point boundaries can be used to generate a different question about the passage.

Figure 3:
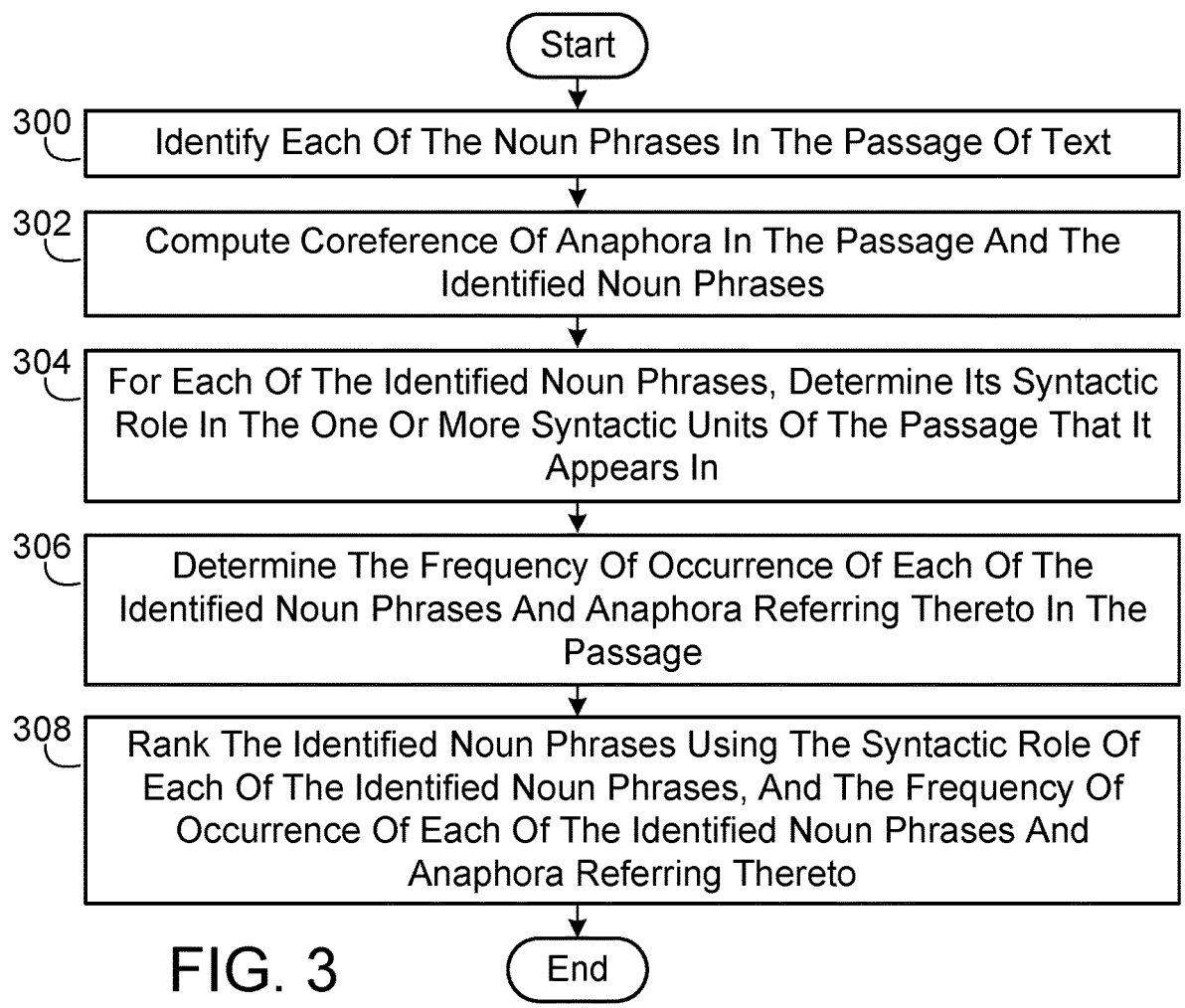
FIG. 3 is a flow diagram illustrating one implementation, in simplified form, of a process for identifying each of the topics in the passage of text and ranking the identified topics according to their importance in the passage.

FIG. 3 illustrates one implementation, in simplified form, of a process for identifying each of the topics in the passage of text and ranking the identified topics according to their importance in the passage. As exemplified in FIG. 3, the process starts with identifying each of the noun phrases in the passage (action 300). It will be appreciated that this noun phrase identification can be performed using a variety of different methods. By way of example but not limitation, in an exemplary implementation of the question generation technique described herein each of the noun phrases in the passage is identified using a conventional constituency parser. The coreference of anaphora in the passage and the identified noun phrases is then computed (action 302). This coreference computation can be performed using a variety of different methods. By way of example but not limitation, in an exemplary implementation of the question generation technique the coreference of anaphora in the passage and the identified noun phrases is computed using the conventional Hobbs method for resolving pronoun references. Exemplary results of performing actions 300 and 302 on the aforementioned passage S1-S3 are shown below, where the topics that are identified are underlined:

S1: Franklin saw the printing press as a device to instruct colonial Americans in moral virtue.

S2: He(=Franklin) tried to influence American moral life through construction of a printing network based on a chain of partnerships from the Carolinas to New England.

S3: Franklin thereby invented the first newspaper chain.

By grouping the above identified topics by their head noun (which is commonly the last word of each noun phrase), it becomes evident that in the passage S1-S3 the topic "Franklin" appears three times, the topic "chain" appears two times, and all of the other identified topics appear just once. This reflects our intuition as human readers that the main theme of the passage S1-S3 is the connection between "Franklin" and "(newspaper) chain".

Referring again to FIG. 3, after each of the topics in the passage of text has been identified (actions 300 and 302), the identified topics are then ranked as follows. For each of the identified noun phrases, the syntactic role of the identified noun phrase (e.g., the syntactic role the identified noun phrase plays) in the one or more syntactic units of the passage that the identified noun phrase appears in is determined (action 304). The frequency of occurrence of each of the identified noun phrases and anaphora referring thereto in the passage is then determined (action 306). The identified noun phrases are then ranked using the syntactic role of each of the identified noun phrases, and the frequency of occurrence of each of the identified noun phrases and anaphora referring thereto (action 308).

Referring again to FIG. 3, it will be appreciated that the just-described process for ranking the identified topics (actions 304, 306 and 308) employs certain insights from the field of Centering Theory. More particularly, Centering Theory says that topics in a passage of text which occur as arguments to verbs in the passage (either main verbs or subordinate verbs) are generally more significant to the meaning of the passage than topics which are not directly related to a predicate/verb. Thus, in the passage S1-S3 "Franklin" is the subject three times, "printing press" is the object once, "newspaper chain" is the object once, "American moral life" is the object once, and "colonial Americans" is the object of a verb in a subordinate clause once. By differentiating between topics that occur in argument roles and topics that do not occur in argument roles, the topics ranking process of actions 304, 306 and 308 is able to rank identified topics that otherwise occur equal numbers of times in the passage. The topics ranking process of actions 304, 306 and 308 will thus rank "printing press" and "American moral life" over "partnerships" and "New England". The topics ranking process of actions 304, 306 and 308 will rank order the identified topics according to their salience in the passage based on the assumption that topics having a higher salience generate better questions. The identified topics in the passage S1-S3 that are in either a subject or object position are bolded below:

S1: Franklin saw the printing press as a device to instruct colonial Americans in moral virtue.

S2: He(=Franklin) tried to influence American moral life through construction of a printing network based on a chain of partnerships from the Carolinas to New England.

S3: Franklin thereby invented the first newspaper chain.

Figure 4:
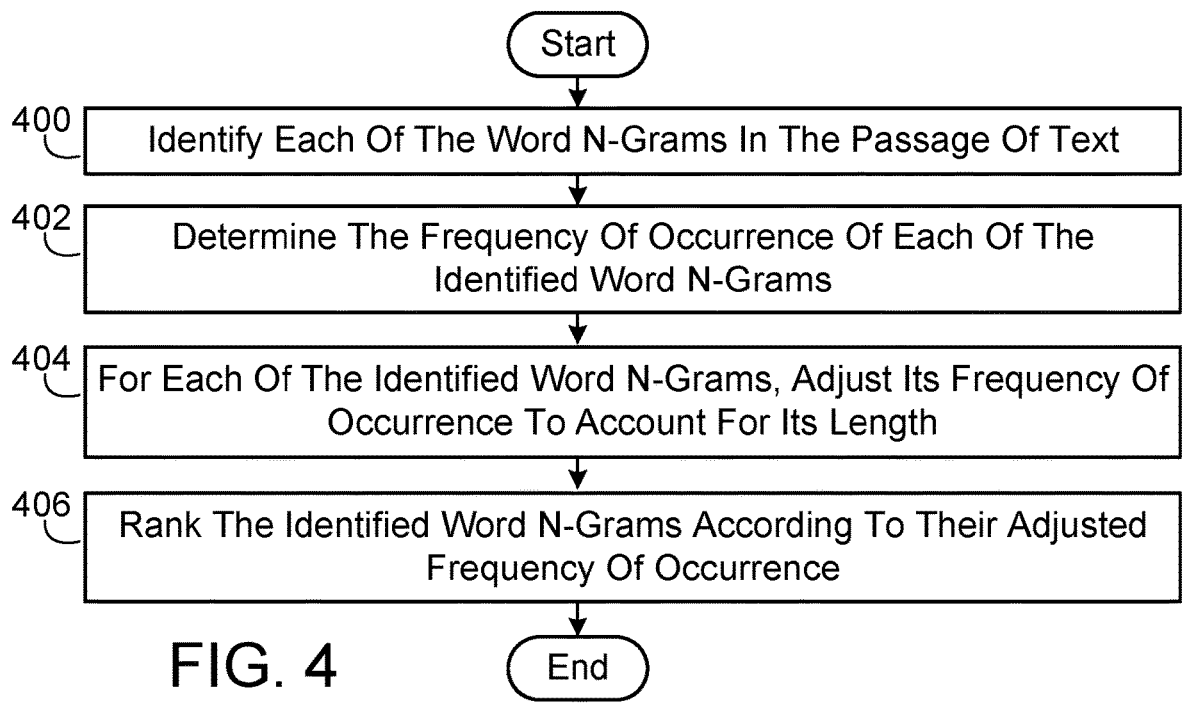
FIG. 4 is a flow diagram illustrating another implementation, in simplified form, of a process for identifying each of the topics in the passage of text and ranking the identified topics according to their importance in the passage.

FIG. 4 illustrates another implementation, in simplified form, of a process for identifying each of the topics in the passage of text and ranking the identified topics according to their importance in the passage. As exemplified in FIG. 4, the process starts with identifying each of the word n-grams in the passage of text (action 400). The frequency of occurrence of each of the identified word n-grams is then determined (action 402). For each of the identified word n-grams, its frequency of occurrence is then adjusted to account for its length (action 404). The identified word n-grams are then ranked according to their adjusted frequency of occurrence (action 406).

The aforementioned action of determining discourse relations between the identified clauses (action 204 in FIG. 2) can be implemented in various ways. An exemplary method for determining discourse relations between the identified clauses is described in more detail hereafter. It is noted that in addition to this exemplary method, various other methods for determining discourse relations between the identified clauses are also possible.

Figure 5:
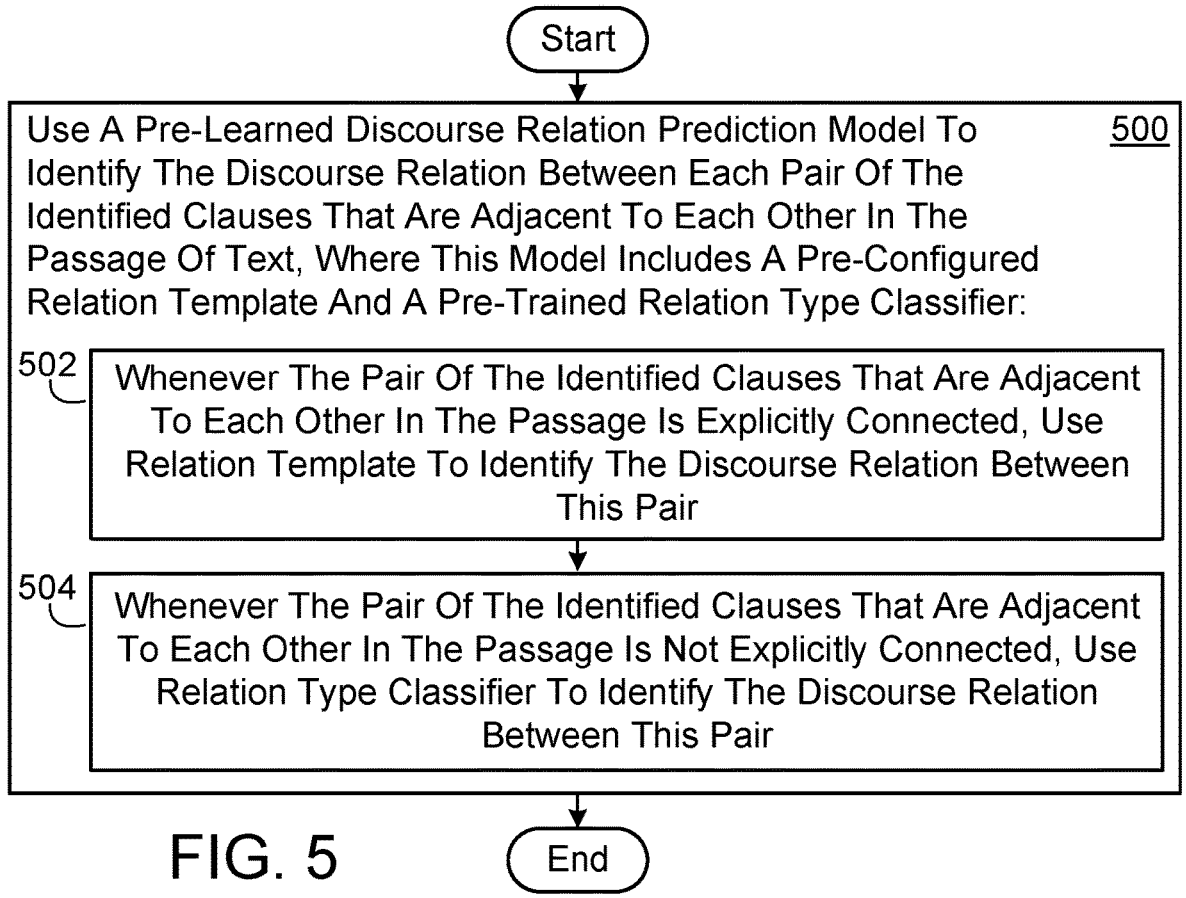
FIG. 5 is a flow diagram illustrating an exemplary implementation, in simplified form, of a process for determining discourse relations between identified clauses in the passage of text.

FIG. 5 illustrates an exemplary implementation, in simplified form, of a process for determining discourse relations between the identified clauses. As exemplified in FIG. 5, the process involves using a pre-learned discourse relation prediction model to identify the most likely discourse relation between each pair of the identified clauses that are adjacent to each other in the passage of text (action 500). In an exemplary implementation of the question generation technique described herein this prediction model includes a pre-configured (e.g., a pre-learned) relation template (e.g., a relation lookup table) and a pre-trained relation type classifier which operate as follows. Whenever the pair of the identified clauses that are adjacent to each other in the passage is explicitly connected, the relation template is used to identify the discourse relation between this pair (action 502). Whenever the pair of the identified clauses that are adjacent to each other in the passage is not explicitly connected, the relation type classifier is used to identify the discourse relation between this pair (action 504).

Exemplary results of performing the just-described process for determining discourse relations between the identified clauses on the passage S1-S3 are shown below, where the discourse relation that is identified between each pair of clauses that are adjacent to each other in the passage S1-S3 is capitalized:

S1: Franklin saw the printing press as a device PURPOSE to instruct colonial Americans in moral virtue. CONSEQUENCE S2: He tried to influence American moral life MANNER through construction of a printing network based on a chain of partnerships from the Carolinas to New England. RESULT S3: Franklin thereby invented the first newspaper chain. In the above results, the adjacent sentences S2 and S3 are explicitly connected by the word "thereby" which signifies the RESULT discourse relation that is identified by the relation template. The adjacent sentences S1 and S2 are not explicitly connected so that the relation type classifier is used to identify the CONSEQUENCE discourse relation.

In an exemplary implementation of the question generation technique described herein the discourse relation prediction model is learned from a fixed set of discourse relations and a large body of text that has been annotated with the discourse relations from this fixed set (e.g., the Penn Discourse Treebank). The fixed set of discourse relations includes a prescribed number of different discourse relations and includes discourse relations such as Cause, Result, Specification, Consequence, Generalization, Time-before, Time-after, Purpose, Manner, and Conditional, among others. It will be appreciated that this prescribed number can range from a relatively small number (e.g., 25) to a relatively large number (e.g., over 100). More particularly, the relation template is configured using this annotated large body of text. The relation type classifier is also trained using this annotated large body of text. The models of the relation type classifier are made up of a variety of features such as syntactic structure of sentences, sentence connectives, tenses, sentence order, parts of speech, lexical representations (e.g., word clusters), and other related features.

In an exemplary implementation of the question generation technique described herein the aforementioned pre-trained split point classifier is trained in the following manner. Given a training corpus that includes different passages of text, a ranked list of topics for each of the passages in the training corpus is generated as described heretofore; the discourse relations in each of the passages in the training corpus are also determined as described heretofore. Then, a group of individuals (who can thought of as judges) is asked to manually examine each of the passages in the training corpus and use the ranked list of topics for the passage, and the discourse relations that are determine to be in the passage, to identify a split point boundary within the passage, where the text before the identified split point boundary is a proposed question context, and the text after the identified split point boundary is a question focus that is associated with the proposed question context. The training corpus is then annotated to identify each of the split point boundaries that was identified by the group of individuals. This annotated training corpus is then used to train the split point classifier. The models of the split point classifier are made up a wide array of features including, but not limited to, the aforementioned features that are associated with the relation type classifier, and various contextual features of the passages of text such as the first occurrence of a high-ranking topic in a proposed question context, the first occurrence of a high-ranking topic in a question focus that is associated with the proposed question context, the presence of a high-ranking topic in a proposed question context, the presence of a high-ranking topic in a question focus that is associated with the proposed question context, the order of the sentences in a given passage of text, the length of each of the sentences in the passage, the parts-of-speech of a proposed question context, and the parts-of-speech of a question focus that is associated with the proposed question context, among others.

Figure 6:
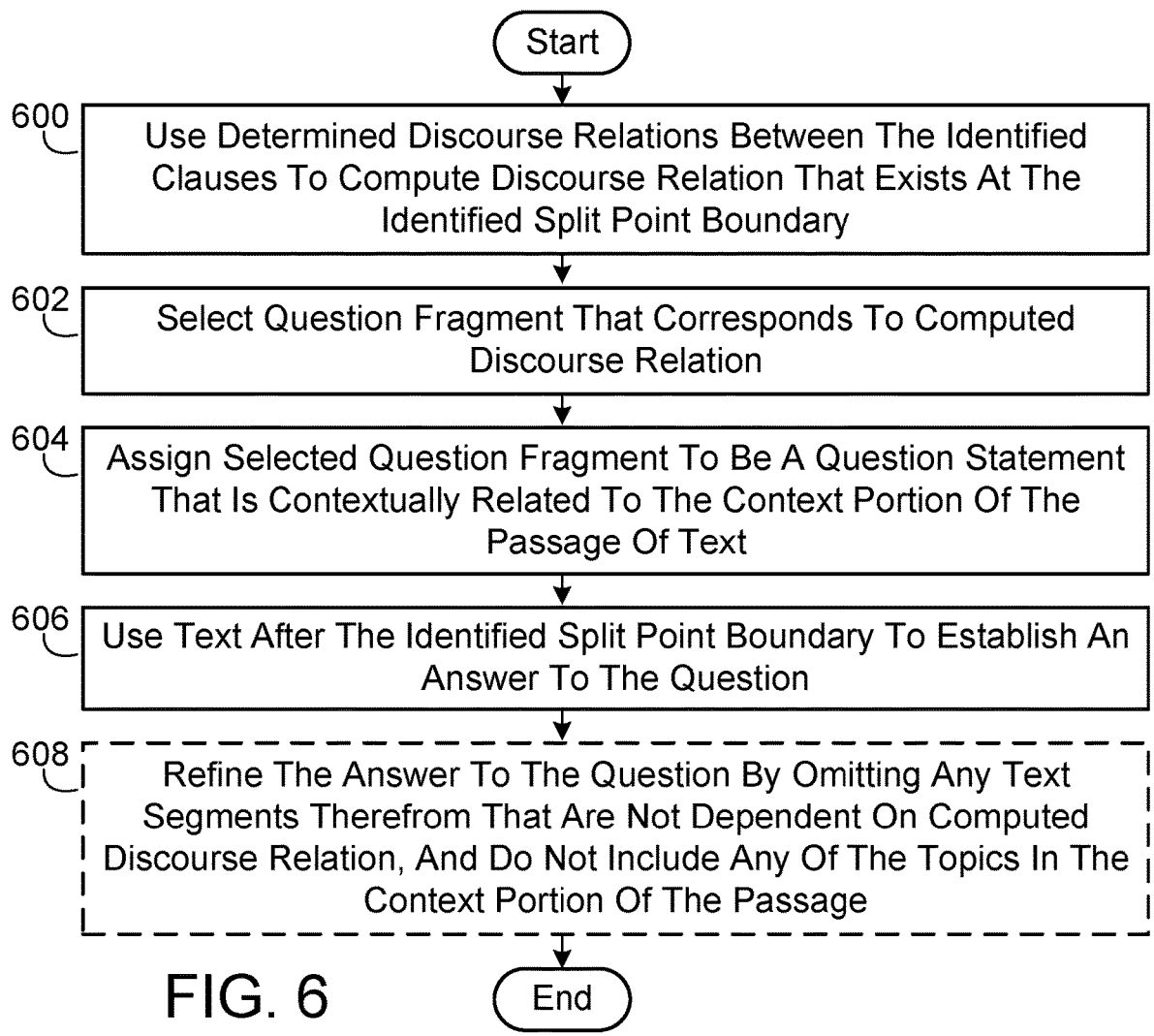
FIG. 6 is a flow diagram illustrating an exemplary implementation, in simplified form, of a process for converting a discourse relation that exists at a split point boundary within the passage of text to the question statement.

FIG. 6 illustrates an exemplary implementation, in simplified form, of a process for converting a discourse relation that exists at the identified split point boundary to the aforementioned question statement that is contextually related to the context portion of the passage of text. As exemplified in FIG. 6, the process starts with using the determined discourse relations between the identified clauses to compute the discourse relation that exists at the identified split point boundary (action 600). A question fragment is then selected that corresponds to this computed discourse relation (action 602). As will be appreciated from the description of the various question generation technique implementations provided herein, a given question fragment can be either a single word that corresponds to a given discourse relation, or a phrase of two or more words that correspond to the discourse relation. Exemplary question fragments that can be selected include "Why?", "How?", "Where?", "What followed?", "What followed from this?", "What resulted?", and "What resulted from this?", among others. Accordingly, a question fragment can be thought of as a prescribed canonical form of a short question that corresponds to a given discourse relation.

Referring again to FIG. 6, after a question fragment has been selected that corresponds to the discourse relation that exists at the identified split point boundary (action 602), the selected question fragment is then assigned to be the question statement (action 604). The text after the identified split point boundary is then used to establish an answer to the question (which as described herein includes the context portion of the passage of text and the question statement) (action 606). The answer to the question can then optionally be refined by omitting (e.g., removing from the answer scope) any text segments therefrom that are not dependent on the discourse relation that exists at the identified split point boundary, and do not include any of the topics in the context portion of the passage (action 608), resulting in a refined answer that includes just text segments which are dependent on the discourse relation that exists at the identified split point boundary, and include one or more of the topics in the context portion of the passage. One example of such a text segment that is not dependent on the discourse relation that exists at the identified split point boundary and does not include any of the topics in the context portion of the passage is when a text segment appears after the identified split point boundary which is associated with a new thought that is unrelated to the text before the identified split point boundary.

The just-described question fragment selection can be performed using a variety of different methods. By way of example but not limitation, in one implementation of the question generation technique described herein a question fragment that corresponds to the discourse relation that exists at the identified split point boundary can be selected using a pre-configured (e.g., a pre-learned) question template (e.g., a question lookup table) that maps each possible discourse relation to a specific question fragment that corresponds thereto. In other words, this question template specifies a prescribed, formulaic question fragment that corresponds to each possible discourse relation. In another implementation of the question generation technique a question fragment that corresponds to the discourse relation that exists at the identified split point boundary can be selected using a pre-trained question type classifier that takes into account the contextual features of the passage of text. The question type classifier is useful in situations where a plurality of different question fragments may correspond to a given discourse relation. More particularly, in such situations, the question type classifier can use the contextual features of the passage to select one of these different question fragments that best represents the discourse relation that exists at the identified split point boundary.

In yet another implementation of the question generation technique described herein, rather than using the discourse relation that exists at the identified split point boundary to select a question fragment as just described, the question type classifier can analyze the contextual features of the passage of text, and from this analysis predict a question fragment that best matches the text before and after the identified split point boundary.

Exemplary results of performing the actions illustrated in FIG. 6 on the passage S1-S3 are shown below:

High-Level Question 1:

S1: Franklin saw the printing press as a device to instruct colonial Americans in moral virtue.

Q5: What followed from this?

Answer to High-Level Question 1:

S2: He tried to influence American moral life through construction of a printing network based on a chain of partnerships from the Carolinas to New England.

S3: Franklin thereby invented the first newspaper chain. In the above results, it is assumed that the split point boundary within the passage S1-S3 was identified to be between the end of sentence S1 and the beginning of sentence S2. Accordingly, the contextualized question statement Q5 that was generated corresponds to the aforementioned CONSEQUENCE discourse relation that exists at this split point boundary.

2.3 Alternate Implementation Using Just Discourse Relations Between Clauses

Figure 7:
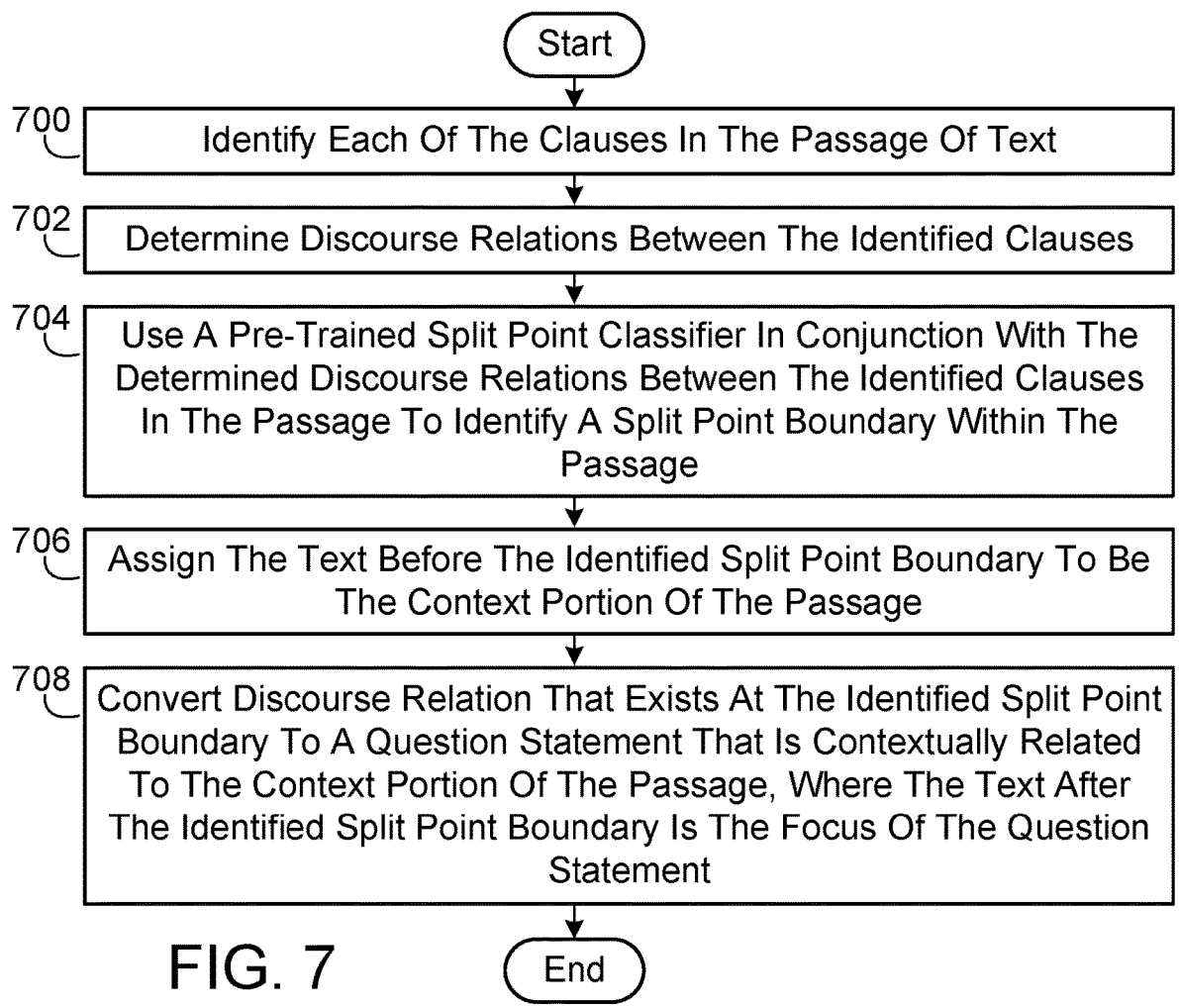
FIG. 7 is a flow diagram illustrating another implementation, in simplified form, of a process for generating a question about the passage of text, where the question covers the content of a plurality of sentences in the passage, and includes a context portion of the passage and a question statement that is contextually related to this context portion.

FIG. 7 illustrates another implementation, in simplified form, of a process for generating a question about the passage of text. As exemplified in FIG. 7, the process starts with identifying each of the clauses in the passage (action 700) as described heretofore. Discourse relations between the identified clauses are then determined (action 702) as also described heretofore. The aforementioned pre-trained split point classifier is then used in conjunction with the determined discourse relations between the identified clauses in the passage to identify a split point boundary within the passage (action 704). The text before the identified split point boundary is then assigned to be context portion of the passage (action 706). A discourse relation that exists at the identified split point boundary is then converted to the aforementioned question statement that is contextually related to the context portion of the passage (action 708) as also described heretofore, where the text after the identified split point boundary is the focus of the question statement.

It will be appreciated that performing the just-described process for generating a question about the passage of text on the passage S1-S3 can also produce the aforementioned high-level question 1 that is composed of the sentence S1 and the question statement Q5.

2.4 Alternate Implementation Using Topics and Explicit Discourse Markers

Figure 8:
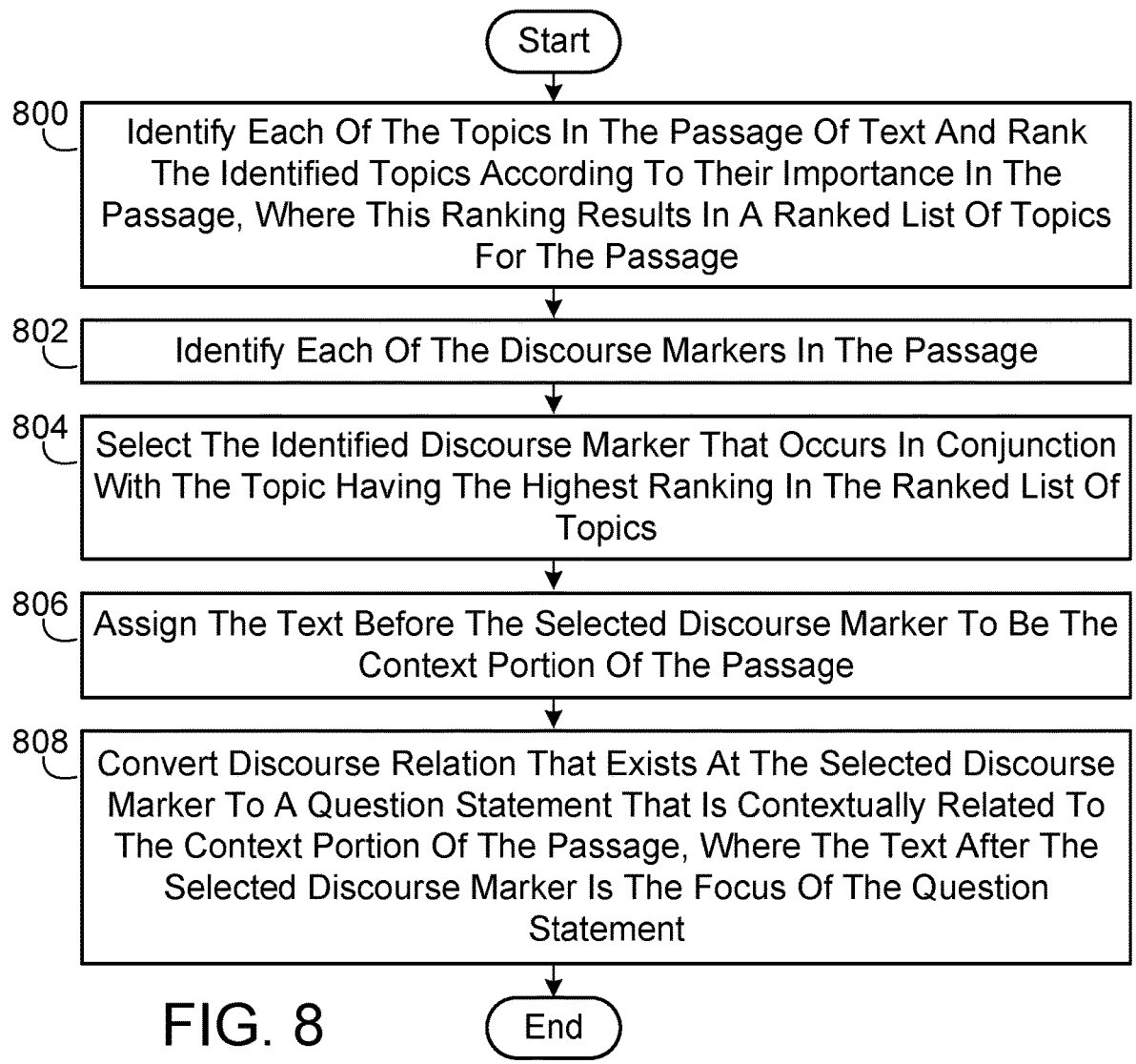
FIG. 8 is a flow diagram illustrating yet another implementation, in simplified form, of a process for generating a question about the passage of text, where the question covers the content of a plurality of sentences in the passage, and includes a context portion of the passage and a question statement that is contextually related to this context portion.

FIG. 8 illustrates yet another implementation, in simplified form, of a process for generating a question about the passage of text. As will be appreciated from the more detailed description that follows, this particular implementation can be used whenever the passage includes one or more explicit discourse markers. Generally speaking and as is appreciated in the art of natural language processing, a discourse marker (sometimes also referred to as either a pragmatic marker, or a linking word/phrase, or a sentence connector) is a word or word phrase that is, in most cases, syntactically independent so that removing a given discourse marker from a given sentence still leaves the sentence structure intact. Discourse markers are often used to direct or redirect the flow of "conversation" in a passage without adding any significant paraphrasable meaning to the passage. In other words, discourse markers have a somewhat "empty meaning" and are often used as fillers or expletives in a passage. Accordingly, discourse markers often come from word classes such as adverbs or prepositional phrases.

The process exemplified in FIG. 8 starts with identifying each of the topics in the passage of text and ranking the identified topics according to their importance in the passage, where this ranking results in a ranked list of topics for the passage (action 800); this topic identification and ranking action is implemented as described heretofore. Each of the discourse markers in the passage is then identified (action 802). In an exemplary implementation of the question generation technique described herein each of the discourse markers in the passage is identified using a prescribed discourse marker list that includes a finite set of words and word phrases that are known to be used as discourse markers. Each of the identified discourse markers can optionally be marked as appearing in either a main clause or a subordinate clause that depends on a particular main clause and may be less central to the content of the passage. The identified discourse marker that occurs in conjunction with the topic having the highest ranking in the ranked list of topics is then selected (action 804). The text before the selected discourse marker is then assigned to be the context portion of the passage (action 806). A discourse relation that exists at the selected discourse marker is then converted to the aforementioned question statement that is contextually related to the context portion of the passage, where the text after the selected discourse marker is the focus of the question statement (action 808).

Figure 9:
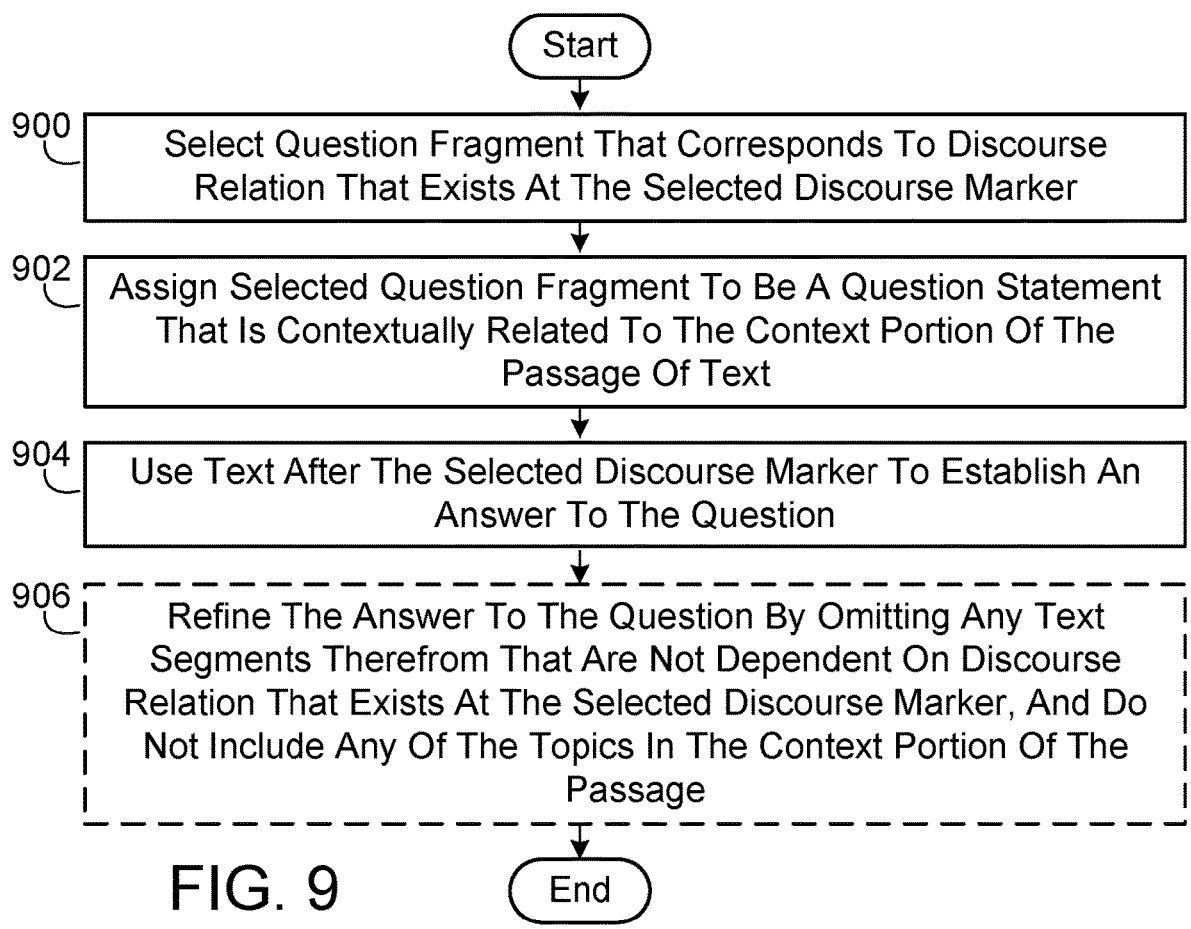
FIG. 9 is a flow diagram illustrating an exemplary implementation, in simplified form, of a process for converting a discourse relation that exists at a selected discourse marker within the passage of text to the question statement.

FIG. 9 illustrates an exemplary implementation, in simplified form, of a process for converting a discourse relation that exists at the selected discourse marker to the question statement. As exemplified in FIG. 9, the process starts with selecting a question fragment that corresponds to the discourse relation that exists at the selected discourse marker (action 900). The selected question fragment is then assigned to be the question statement (action 902). The text after the selected discourse marker is then used to establish an answer to the question (which as described herein includes the context portion of the passage of text and the question statement) (action 904). The answer to the question can then optionally be refined by omitting any text segments therefrom that are not dependent on the discourse relation that exists at the selected discourse marker, and do not include any of the topics in the context portion of the passage (action 906), resulting in a refined answer that includes just text segments which are dependent on the discourse relation that exists at the selected discourse marker, and include one or more of the topics in the context portion of the passage.

The just-described question fragment selection can be performed using a variety of different methods. By way of example but not limitation, in one implementation of the question generation technique described herein a question fragment that corresponds to the discourse relation that exists at the selected discourse marker can be selected using the aforementioned pre-configured question template. In another implementation of the question generation technique a question fragment that corresponds to the discourse relation that exists at the selected discourse marker can be selected using the aforementioned pre-trained question type classifier.

Exemplary results of performing the just-described process for generating a question about the passage of text on the passage S1-S3 are shown below:

High-Level Question 2:

S1: Franklin saw the printing press as a device to instruct colonial Americans in moral virtue.

S2: He tried to influence American moral life

Q6: How did he do this?

Answer to High-Level Question 2:

S2: through construction of a printing network based on a chain of partnerships from the Carolinas to New England.

S3: Franklin thereby invented the first newspaper chain. In the above results, it is assumed that "Franklin" is the highest ranked (e.g., the most important) topic in the passage S1-S3. It is also assumed that "through construction" is the explicit discourse marker in the passage S1-S3 that occurs in conjunction with "Franklin".

2.5 Alternate Implementation Using Just Explicit Discourse Markers

Figure 10:
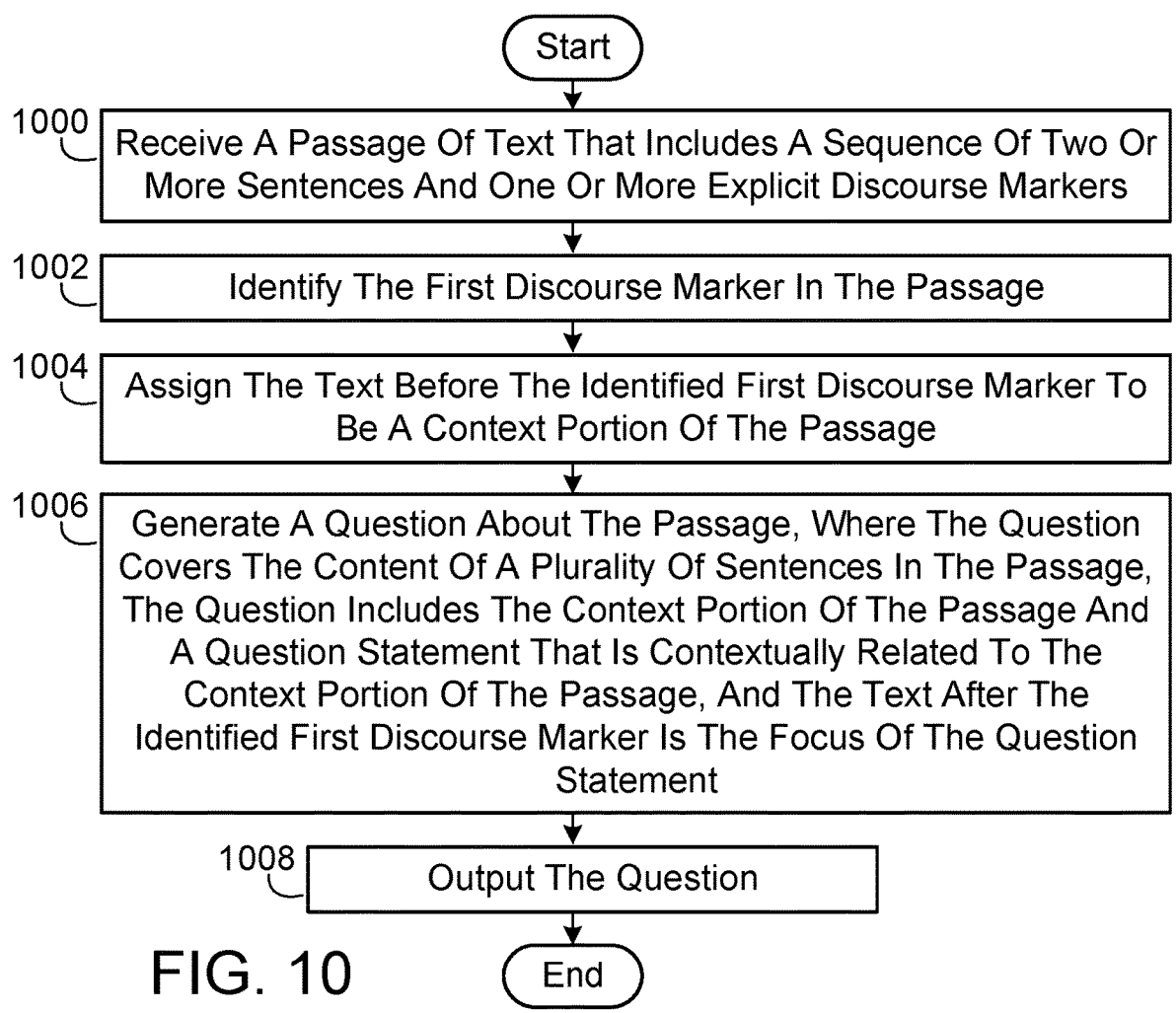
FIG. 10 is a flow diagram illustrating another implementation, in simplified form, of a process for generating questions about a passage of text.

FIG. 10 illustrates another implementation, in simplified form, of a process for generating questions about a passage of text that includes a sequence of two or more sentences, where the passage also includes one or more explicit discourse markers. As will be appreciated from the more detailed description that follows, this particular implementation does not rely upon identifying topics in the passage, and also does not rely upon identifying clauses in the passage. Rather, this particular implementation generates questions about the passage solely from the explicit discourse markers that are present in the passage.

The process exemplified in FIG. 10 starts with receiving the passage of text (action 1000). The first discourse marker in the passage is then identified (action 1002). In an exemplary implementation of the question generation technique described herein the first discourse marker in the passage is identified using the aforementioned prescribed discourse marker list. The text before the identified first discourse marker is then assigned to be a context portion of the passage (action 1004). A question about the passage is then generated, where the question covers the content of a plurality of the sentences in the passage, the question includes the context portion of the passage and a question statement that is contextually related to the context portion of the passage, and the text after the identified first discourse marker is the focus of the question statement (action 1006). The question is then output (action 1008).

Figure 11:
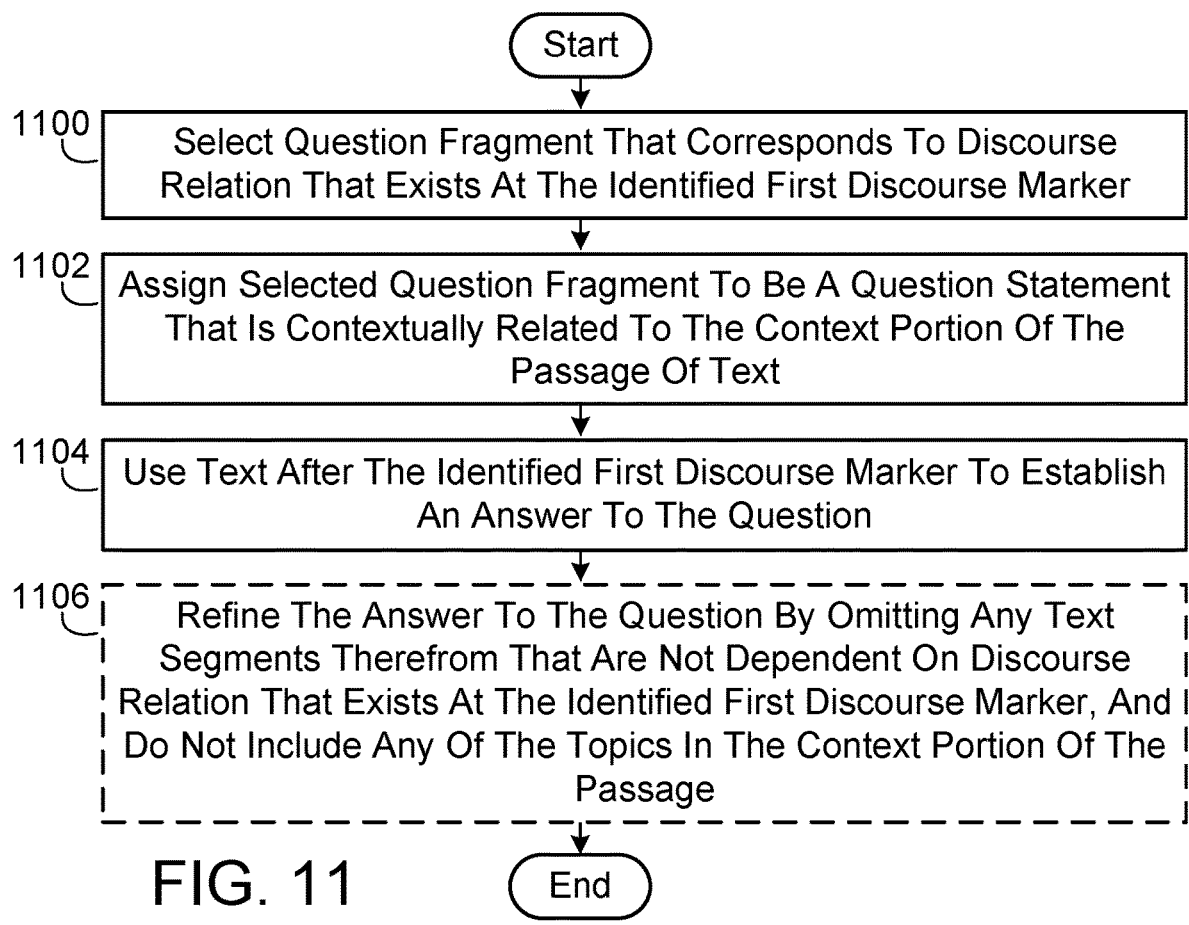
FIG. 11 is a flow diagram illustrating yet another implementation, in simplified form, of a process for generating a question about the passage of text, where the question covers the content of a plurality of sentences in the passage, and includes a context portion of the passage and a question statement that is contextually related to this context portion.

FIG. 11 illustrates an exemplary implementation, in simplified form, of a process for the just-described action of generating a question about the passage of text (action 1006 in FIG. 10). As exemplified in FIG. 11, the process starts with selecting a question fragment that corresponds to a discourse relation that exists at the identified first discourse marker (action 1100). The selected question fragment is then assigned to be the aforementioned question statement that is contextually related to the context portion of the passage (action 1102). The text after the identified first discourse marker is then used to establish an answer to the question (which as described herein includes the context portion of the passage and the question statement) (action 1104). The answer to the question can then optionally be refined by omitting any text segments therefrom that are not dependent on the discourse relation that exists at the identified first discourse marker, and do not include any of the topics in the context portion of the passage (action 1106), resulting in a refined answer that includes just text segments which are dependent on the discourse relation that exists at the identified first discourse marker, and include one or more of the topics in the context portion of the passage.

The just-described question fragment selection can be performed using a variety of different methods. By way of example but not limitation, in one implementation of the question generation technique described herein a question fragment that corresponds to the discourse relation that exists at the identified first discourse marker can be selected using the aforementioned pre-configured question template. In another implementation of the question generation technique a question fragment that corresponds to the discourse relation that exists at the identified first discourse marker can be selected using the aforementioned pre-trained question type classifier.

Exemplary results of performing the just-described process for generating a question about the passage of text on the passage S1-S3 are shown below:

High-Level Question:

S1: Franklin saw the printing press as a device to instruct colonial Americans in moral virtue.

S2: He tried to influence American moral life through construction of a printing network based on a chain of partnerships from the Carolinas to New England.

Q7: What did this result in?

Answer to High-Level Question:

S3: Franklin thereby invented the first newspaper chain. In the above results, it is assumed that "thereby" is the first discourse marker in the passage S1-S3. Accordingly, the contextualized question statement Q7 that was generated corresponds to the aforementioned RESULT discourse relation that exists at the discourse marker "thereby".

2.6 User Interface

Figure 13:
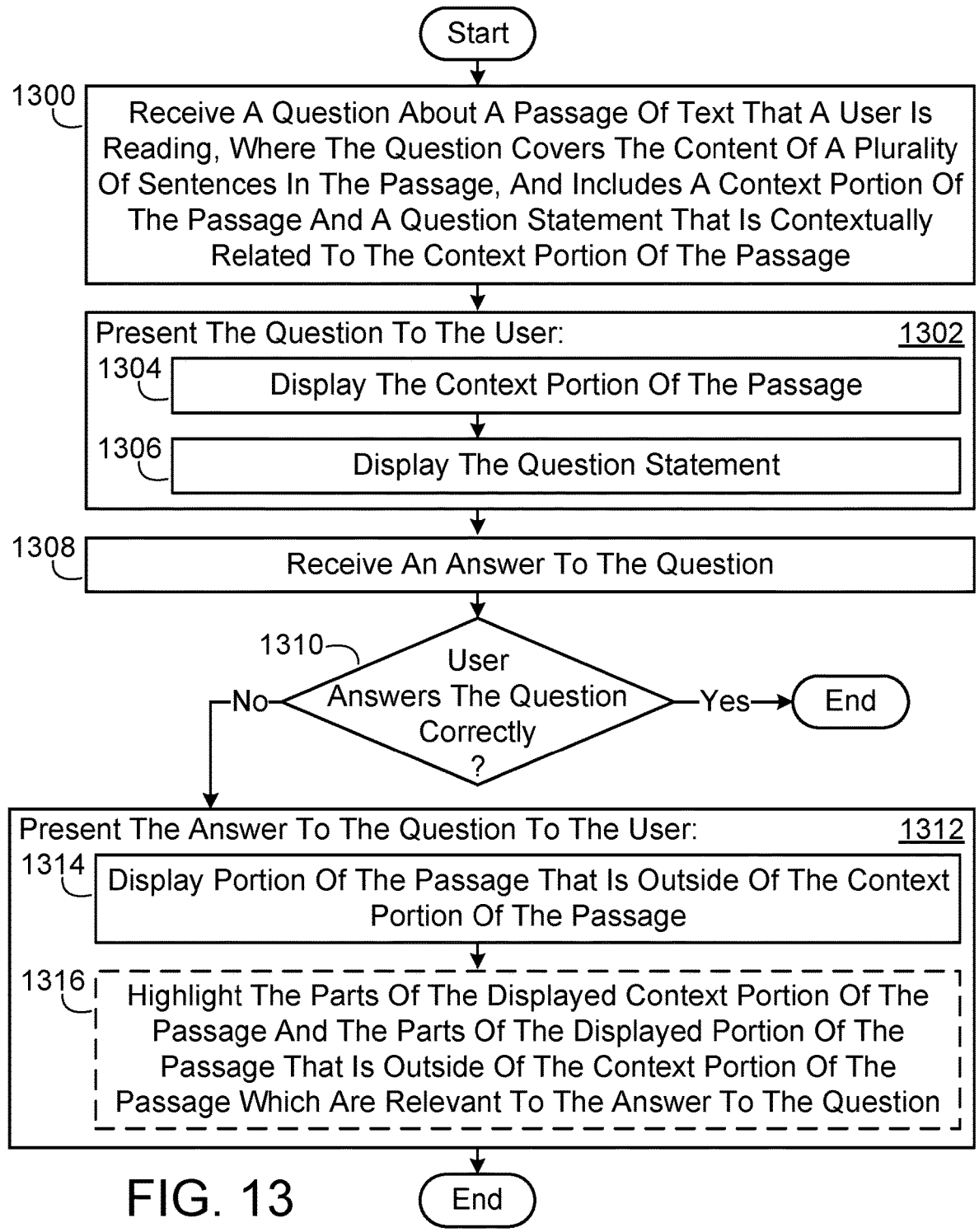
FIG. 13 is a flow diagram illustrating an exemplary implementation, in simplified form, of a process for providing a user with questions about a passage of text they are reading.

FIG. 13 illustrates an exemplary implementation, in simplified form, of a process for providing a user with questions about a passage of text they are reading, where the passage includes a sequence of two or more sentences. As exemplified in FIG. 13, the process starts with receiving a question about the passage, where the question covers the content of a plurality of the sentences in the passage, and the question includes a context portion of the passage and a question statement that is contextually related to the context portion of the passage (action 1300). The question is then presented to the user (action 1302), where this question presentation includes displaying the context portion of said passage (action 1304) and displaying the question statement (action 1306). An answer to the question is then received, where this answer resides within either a single sentence in the portion of the passage that is outside of the context portion of the passage, or a plurality of sentences in the portion of the passage that is outside of the context portion of the passage (action 1308). Whenever the user answers the question incorrectly (action 1310, No), the answer to the question is presented to the user (action 1312). This answer presentation (action 1312) includes displaying the portion of the passage that is outside of the context portion of the passage (action 1314). The answer presentation (action 1312) can optionally also include highlighting the parts of the displayed context portion of the passage and the parts of the displayed portion of the passage that is outside of the context portion of the passage which are relevant to the answer to the question (action 1316).

Referring again to FIG. 13, it is noted that the just-described answer presentation of actions 1312, 1314 and 1316 is advantageous in that it enables a self-grading context in which the user is able to check their work. It is also noted that the combination of actions 1314 and 1316 is advantageous in that it allows the user to see the portion of the passage in which the answer to the question is found (e.g., the answer region of the passage) in conjunction with seeing the portion of the passage to which the question is contextually related (e.g., the question region of the passage).

2.7 Architectural Framework

Figure 14:
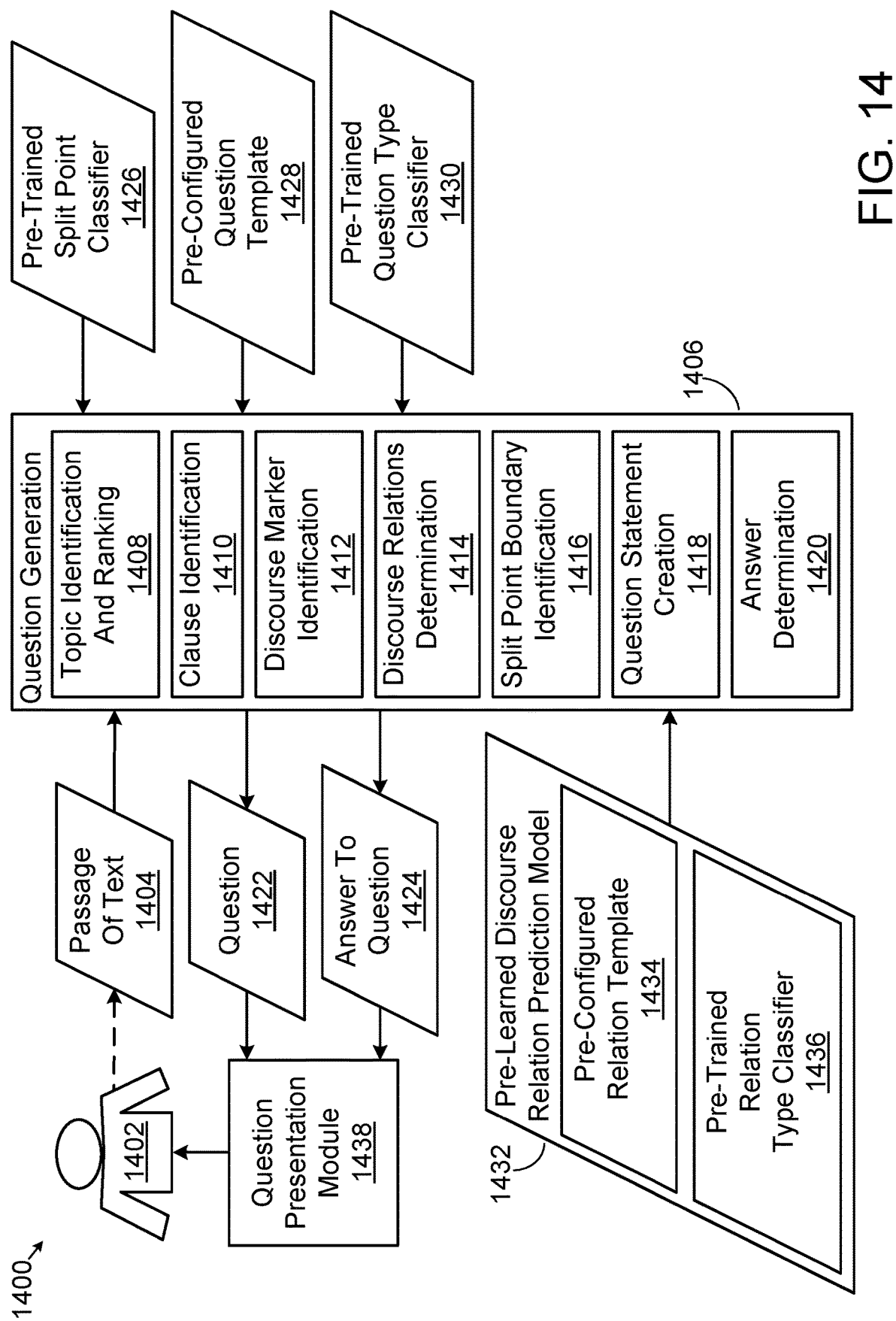
FIG. 14 is a diagram illustrating an exemplary implementation, in simplified form, of an architectural framework for realizing the question generation technique implementations described herein.

FIG. 14 illustrates an exemplary implementation, in simplified form, of an architectural framework for realizing the question generation technique implementations described herein. As exemplified in FIG. 14, the architectural framework 1400 includes a question generation module 1406 that is employed in the aforementioned process for generating questions about a passage of text 1404. More particularly, the question generation module 1406 receives the passage 1404 and generates a question 1422 about the passage that covers the content of a plurality of sentences in the passage, and includes a context portion of the passage and a question statement that is contextually related to this context portion. The question generation module 1406 includes a topic identification and ranking module 1408, a clause identification module 1410, a discourse marker identification module 1412, a discourse relations determination module 1414, a split point boundary identification module 1416, a question statement creation module 1418, and an answer determination module 1420.

Referring again to FIG. 14, the topic identification and ranking module 1408 identifies each of the topics in the passage of text 1404 and ranks the identified topics according to their importance in the passage 1404, where this ranking results in a ranked list of topics for the passage. The clause identification module 1410 identifies each of the clauses in the passage 1404. The discourse relations determination module 1414 uses the aforementioned pre-learned discourse relation prediction model 1432 to determine discourse relations between the identified clauses, where the discourse relation prediction model 1432 includes a pre-configured relation template 1434 and a pre-trained relation type classifier 1436 as described heretofore. The split point boundary identification module 1416 use the aforementioned pre-trained split point classifier 1426 in conjunction with the ranked list of topics and the determined discourse relations between the identified clauses to identify a split point boundary within the passage 1404. The question statement creation module 1418 uses either the aforementioned pre-configured question template 1428 or the aforementioned pre-trained question type classifier 1430 to convert a discourse relation that exists at the identified split point boundary to the question statement that is contextually related to the context portion of the passage 1404. The answer determination module 1420 uses the text after the identified split point boundary to establish an answer to the question 1424, and optionally refines this answer as described heretofore.

Referring again to FIG. 14, in the situation where the passage of text 1404 includes one or more explicit discourse markers, the discourse marker identification module 1412 can identify each of the discourse markers in the passage 1404 and then select one of the identified discourse markers that occurs in conjunction with the highest ranked topic in the passage. The question statement creation module 1418 can then use either the pre-configured question template 1428 or the pre-trained question type classifier 1430 to convert a discourse relation that exists at the selected discourse marker to the question statement that is contextually related to the context portion of the passage 1404. The answer determination module 1420 can then use the text after the selected discourse marker to establish an answer to the question 1424, and optionally refine this answer as described heretofore.

Referring again to FIG. 14, in the situation where the passage of text 1404 includes one or more explicit discourse markers, the discourse marker identification module 1412 can also identify the first discourse marker in the passage 1404. The question statement creation module 1418 can then use either the pre-configured question template 1428 or the pre-trained question type classifier 1430 to convert a discourse relation that exists at the identified first discourse marker to the question statement that is contextually related to the context portion of the passage 1404. The answer determination module 1420 can then use the text after the identified first discourse marker to establish an answer to the question 1424, and optionally refine this answer as described heretofore.

Referring again to FIG. 14, the architectural framework 1400 also includes a question presentation module 1438 that is employed in the aforementioned process for providing a user 1402 with questions about a passage of text 1404 they are reading. More particularly, the question presentation module 1438 receives the question 1422 about the passage 1404 that covers the content of a plurality of sentences in the passage, and includes a context portion of the passage and a question statement that is contextually related to this context portion. The question presentation module 1438 also receives an answer to the question 1424. The question presentation module 1438 then presents the question 1422 about the passage 1404 to the user 1402 as described heretofore. Whenever the user 1402 answers the question 1422 incorrectly, the question presentation module 1438 then presents the answer to the question 1424 to the user as also described heretofore.

3.0 Additional Implementations

While the question generation technique has been described by specific reference to implementations thereof, it is understood that variations and modifications thereof can be made without departing from the true spirit and scope of the question generation technique. For example, the question generation technique implementations described herein can be implemented in the form of a question generation system that can be used by teachers and other types of educators to automatically generate a set of test questions from a textbook or any other type of educational textual content that is being used to teach a given class. Additionally, an alternate implementation of the question generation technique is possible where a user who is reading a given passage of text can specify a particular type of discourse relation that they are interested in (e.g., the user can specify that they want to be presented with just CONSEQUENCE questions, or just RESULTS questions), and this specified particular type of discourse relation can be used to filter the questions about the passage that are presented to the user. More particularly, after the pre-trained split point classifier is used in conjunction with the ranked list of topics for the passage and the determined discourse relations between the identified clauses in the passage to identify a set of candidate split point boundaries within the passage, the split point classifier can filter the set of candidate split point boundaries such that any candidate split point boundaries in the set that do not correspond to the particular type of discourse relation the user is interested in are omitted from the set, resulting in a filtered set of candidate split point boundaries that includes just candidate split point boundaries that correspond to the particular type of discourse relation the user is interested in).

Furthermore, it will be appreciated that more than one discourse relation may exist between a given pair of clauses in a given passage of text. For example, more than one explicit discourse relation may exist between the pair of clauses, or mixed explicit/implicit discourse relations may exist between the pair of clauses, or more than one implicit discourse relation may exist between the pair of clauses. In the case where a plurality of explicit discourse relations exists between a given pair of clauses, the aforementioned pre-trained relation type classifier can be used to disambiguate these relations.

It is also noted that any or all of the aforementioned implementations can be used in any combination desired to form additional hybrid implementations. Although the question generation technique implementations have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Exemplary Operating Environments

Figure 15:
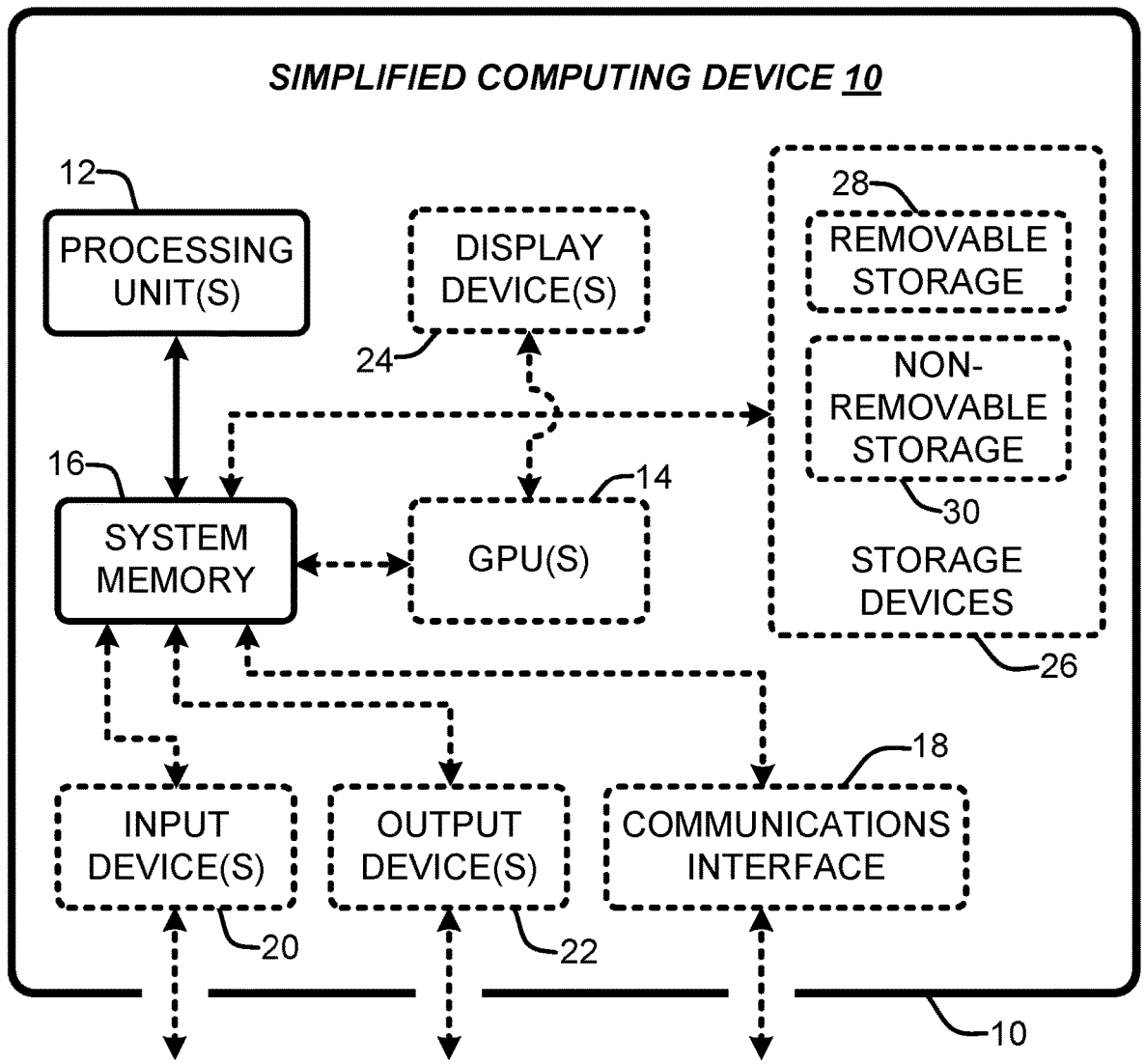
FIG. 15 is a diagram illustrating a simplified example of a general-purpose computer system on which various implementations and elements of the question generation technique, as described herein, may be realized.

The question generation technique implementations described herein are operational within numerous types of general purpose or special purpose computing system environments or configurations. FIG. 15 illustrates a simplified example of a general-purpose computer system on which various implementations and elements of the question generation technique, as described herein, may be implemented. It is noted that any boxes that are represented by broken or dashed lines in the simplified computing device 10 shown in FIG. 15 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the question generation technique implementations described herein, the device should have a sufficient computational capability and system memory to enable basic computational operations. In particular, the computational capability of the simplified computing device 10 shown in FIG. 15 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 15 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 15 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various question generation technique implementations described herein, or portions thereof, may be stored, received, transmitted, or read from any desired combination of computer-readable or machine-readable media or storage devices and communication media in the form of computer-executable instructions or other data structures.

Finally, the question generation technique implementations described herein may be further described in the general context of computer-executable instructions, such as program modules, being executed by a computing device. Generally, program modules include routines, programs, objects, components, data structures, and the like, that perform particular tasks or implement particular abstract data types. The question generation technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

The invention claimed is:

1. A computer-implemented process for generating questions about a passage including a sequence of two or more sentences, comprising:
   receiving computer-readable text data representing the passage;
   counting occurrences of different phrases in the computer-readable text data;
   ranking the different phrases by frequency of occurrence;
   selecting a set of topic phrases based on the ranking of the different phrases;
   operating a discourse relation prediction model previously trained to predict, for each pair of adjacent clauses in the computer-readable text data, a computer-readable discourse relationship;
   operating a classifier previously trained to:
      receive the computer-readable text data, the set of topic phrases, and the computer-readable discourse relationship for each of said pair of adjacent clauses in the computer-readable text data, and
      output a context clause and a focus clause in the computer-readable text data;
   translating the context clause into a question statement, wherein the question statement has an answer related to the focus clause; and
   outputting a question based on the question statement.

2. The process of claim 1, further comprising outputting an answer text based on the answer related to the focus clause.

3. The process of claim 1, wherein the classifier is trained on training data including a plurality of annotated passages, wherein each annotated passage includes exemplary computer-readable text data, annotated to indicate a boundary between an exemplary context clause in the computer-readable text data and an exemplary focus clause in the computer-readable text data.

4. The process of claim 1, wherein the classifier is configured to identify, in the computer-readable text data, an explicit discourse marker indicating a boundary between the context clause and the focus clause in the computer-readable text data.

5. The process of claim 4, wherein the explicit discourse marker is a phrase from a finite set of phrases.

6. The process of claim 1, wherein the classifier includes a machine-learning split point boundary classifier previously trained to output a split point boundary location indicating a boundary between the context clause and the focus clause in the computer-readable text data.

7. The process of claim 6, wherein operating the classifier includes:
   using the machine-learning split point boundary classifier in conjunction with the set of topic phrases and the computer-readable discourse relationship predicted by the discourse relation prediction model, to identify a set of candidate split point boundaries within said passage;
   using the machine-learning split point boundary classifier to score each of the candidate split point boundaries;
   selecting one of the candidate split point boundaries having a highest score; and
   assigning such selected candidate split point boundary to be the split point boundary location indicating the boundary between the context clause and the focus clause in the computer-readable text data.

8. The process of claim 6, wherein the machine-learning split point boundary classifier is trained on training data including a plurality of annotated passages, wherein each annotated passage includes exemplary computer-readable text data, an exemplary set of discourse relations for the exemplary computer-readable text data, an exemplary set of topic phrases for the exemplary computer-readable text data, and a split point label indicating an exemplary split point boundary location for the exemplary computer-readable text data.

9. The process of claim 1, wherein the discourse relation prediction model is trained on training data including a plurality of exemplary adjacent clause pairs, each exemplary adjacent clause pair labelled with an exemplary computer-readable discourse relationship.

10. The process of claim 1, wherein said passage further comprises one or more noun phrases, and selecting the set of topic phrases based on the ranking of the different phrases includes:
    identifying each noun phrase in said passage;
    computing coreference of anaphora in said passage and the identified noun phrases;
    for each identified noun phrase, determining a syntactic role of the identified noun phrase in one or more syntactic units of said passage that the identified noun phrase appears in;
    determining the frequency of occurrence of each of the identified noun phrases and anaphora referring thereto in said passage; and
    ranking the identified noun phrases using the syntactic role of each of the identified noun phrases, and the frequency of occurrence of each of the identified noun phrases and anaphora referring thereto.

11. The process of claim 1, wherein said passage includes a sequence of word n-grams, and selecting the set of topic phrases based on the ranking of the different phrases includes:
    identifying each word n-gram in said passage;
    determining a frequency of occurrence of each identified word n-gram;
    for each identified word n-gram, adjusting a corresponding frequency of occurrence to account for a length of the identified word n-gram; and
    ranking the identified word n-grams according to such adjusted frequency of occurrence.

12. The process of claim 1, wherein the discourse relation prediction model comprises a pre-configured relation template and a pre-trained relation type classifier, and using the discourse relation prediction model to identify the discourse relation between each pair of identified clauses that are adjacent to each other in said passage comprises:
    whenever the pair of identified clauses that are adjacent to each other in said passage is explicitly connected, using the pre-configured relation template to identify the discourse relationship between said pair; and
    whenever the pair of the identified clauses that are adjacent to each other in said passage is not explicitly connected, using the pre-trained relation type classifier to identify the discourse relationship between said pair.

13. The process of claim 1, wherein translating the context clause into the question statement includes:
    using the discourse relationship predicted for each of said pair of adjacent clauses to compute a computed discourse relation that exists at a boundary between the context clause and the focus clause;

selecting a question fragment that corresponds to said computed discourse relation;

assigning the selected question fragment to be the question statement; and using the text after the boundary to establish the answer related to the focus clause.

14. The process of claim 13, wherein selecting the question fragment that corresponds to said computed discourse relation includes using a pre-configured question template to select the question fragment, said template mapping each possible discourse relation to a specific question fragment corresponding thereto.

15. The process of claim 13, wherein selecting the question fragment that corresponds to said computed discourse relation includes using a pre-trained question type classifier to select said question fragment, said classifier taking into account contextual features of said passage.

16. A system for generating questions about a passage of text, comprising:

a logic device; and a storage device holding instructions executable by the logic device to:

receive computer-readable text data representing the passage;

count occurrences of different phrases in the computer-readable text data;

rank the different phrases by frequency of occurrence;

select a set of topic phrases based on the ranking of the different phrases;

operate a discourse relation prediction model previously trained to predict, for each pair of adjacent clauses in the computer-readable text data, a computer-readable discourse relationship;

operate a classifier previously trained to:

receive the computer-readable text data, the set of topic phrases, and the computer-readable discourse relationship for each of said pair of adjacent clauses in the computer-readable text data, and output a context clause and a focus clause in the computer-readable text data;

translate the context clause into a question statement, wherein the question statement has an answer related to the focus clause;

output a question based on the question statement.

17. The system of claim 16, wherein the instructions are further executable by the logic device to output an answer text based on the answer related to the focus clause.

18. A computer-implemented process for generating questions about a passage including a sequence of two or more sentences, comprising:

receiving computer-readable text data representing the passage;

counting occurrences of different phrases in the computer-readable text data;

ranking the different phrases by frequency of occurrence;

selecting a set of topic phrases based on the ranking of the different phrases;

operating a discourse relation prediction model previously trained to predict, for each pair of adjacent clauses in the computer-readable text data, a computer-readable discourse relationship;

operating a classifier previously trained to:

receive the computer-readable text data, the set of topic phrases, and the computer-readable discourse relationship for each of said pair of adjacent clauses in the computer-readable text data, and output a context clause and a focus clause in the computer-readable text data;

translating the context clause into a question statement, wherein the question statement has an answer related to the focus clause; and using a question presentation module to present a question based on the question statement.

19. The process of claim 18, wherein the question presentation module is configured to present the question by displaying the context clause and the question statement to a user.

20. The process of claim 19, wherein the question presentation module is further configured to:

receive a submitted answer to the question from the user; and whenever the user answers the question incorrectly, present the answer related to the focus clause to the user by displaying a portion of said passage that is outside of the context clause.

* * * * *